(12) United States Patent
Jones et al.

(10) Patent No.: US 8,126,197 B2
(45) Date of Patent: Feb. 28, 2012

(54) METHOD FOR IMAGE QUALITY ASSESSMENT USING QUALITY VECTORS

(75) Inventors: Paul W. Jones, Churchville, NY (US); Chris W. Honsinger, Ontario, NY (US); Robert J. McComb, Mississauga (CA)

(73) Assignee: Certifi-Media Inc., Union Hill, NY (US)

( * ) Notice: Subject to any disclaimer, the term of this patent is extended or adjusted under 35 U.S.C. 154(b) by 704 days.

(21) Appl. No.: 12/274,438

(22) Filed: Nov. 20, 2008

(65) Prior Publication Data

US 2009/0141932 A1   Jun. 4, 2009

Related U.S. Application Data

(60) Provisional application No. 60/990,925, filed on Nov. 29, 2007.

(51) Int. Cl.
*G06K 9/00*   (2006.01)
(52) U.S. Cl. .................................................. 382/100
(58) Field of Classification Search .............. 382/100, 382/254
See application file for complete search history.

(56) References Cited

U.S. PATENT DOCUMENTS

| 5,912,972 | A | 6/1999 | Barton | |
|---|---|---|---|---|
| 6,278,791 | B1* | 8/2001 | Honsinger et al. | 382/100 |
| 6,778,702 | B1 | 8/2004 | Sweet | |
| 7,006,662 | B2 | 2/2006 | Alattar et al. | |
| 7,706,567 | B2* | 4/2010 | McComb | 382/100 |
| 2005/0089246 | A1 | 4/2005 | Luo | |
| 2006/0188170 | A1* | 8/2006 | Kanda et al. | 382/255 |

FOREIGN PATENT DOCUMENTS

WO   WO 0062556 A1   10/2000

OTHER PUBLICATIONS

P. Marzilario, F. Dufaux, S. Winkler, T. Ebrahimi, "A no-reference perceptual blur metric" Proceedings of the IEEE International Committee on Image Processing, vol. III, pp. 57-60, Sep. 2002.

* cited by examiner

*Primary Examiner* — Tom Y Lu
(74) *Attorney, Agent, or Firm* — Louis S. Horvath

(57) ABSTRACT

A method for assessing the image quality of image data acquires image data, segments the image data into at least one spatial region, obtains a plurality of image quality measures for the at least one spatial region, and forms at least one quality vector that has two or more quality measures for the at least one spatial region. The at least one quality vector is classified into one of a plurality of predefined quality classes.

12 Claims, 21 Drawing Sheets

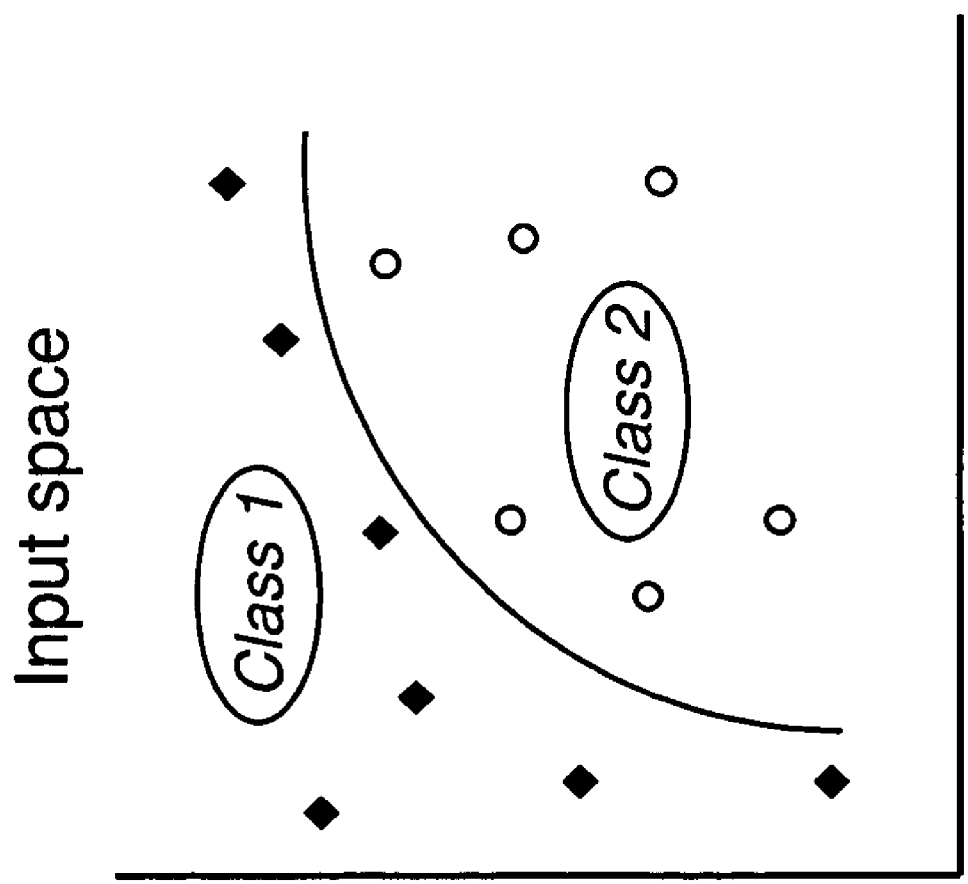

METHOD FOR IMAGE QUALITY ASSESSMENT USING QUALITY VECTORS

RELATED APPLICATIONS

Reference is made to, and priority is claimed from, U.S. application No. 60/990,925, filed as a provisional patent application on Nov. 29, 2007, entitled "Method For Image Quality Assessment Using Quality Vectors", in the names of Paul W. Jones, Chris W. Honsinger, and Robert J. McComb, and commonly assigned. Reference is also made to commonly assigned application Ser. No. 11/454,673, filed May 16, 2006 and entitled "Assured Document and Method of Making" by Robert J. McComb, and to commonly assigned application Ser. No. 11/940,347, filed Nov. 15, 2007 and entitled "Method for Making an Assured Image" by Chris W. Honsinger, Paul W. Jones, and Robert J. McComb.

FIELD OF THE INVENTION

The invention relates generally to image quality and data integrity in digital image processing, and in particular to a method for assessing and certifying the quality of a digital image representation of a physical medium or scene and securing the integrity of the quality certification and the digital image representation.

BACKGROUND OF THE INVENTION

Corporations, institutions, and governments spend hundreds of millions of dollars each year to digitize documents, films, maps, books, and other physical media. Included in this mix are billions of pages of medical records, legal evidence, corporate documents, material from national and regional archives, and banking checks. The resulting digital image files represent valuable information whose accuracy has significance in current working operations and for long-term archiving. The digitization process is the gateway for this information onto networked systems, which allows for convenient, cost effective, and efficient transmission, storage, searching, and retrieval of the image information.

Organizations also spend vast amounts of money on capturing day-to-day activities with digital image capture devices, such as inspection cameras for manufacturing processes, forensic crime-scene cameras, in-car police cameras, automated teller machine (ATM) cameras, and surveillance cameras for monitoring facilities, equipment, and personnel. Some applications use computer vision techniques to automatically analyze the images for certain features or events. In many cases, the images that are produced by these digital acquisition devices are never viewed by a human unless a specific event triggers a review. However, regardless of whether the images are analyzed by computers or viewed by humans, it is essential that the image data represents the physical scene with sufficient fidelity for the intended application.

Because of the sensitive nature of the information in many applications, it is important to ensure that image data is not tampered with after it is generated. It is a simple matter to change the contents of a digital image by using an image editor or other readily available computer technology. One approach to ensuring data integrity is to use encryption. However, encryption can be computationally expensive for large amounts of data, such as is the case for high resolution images and video sequences.

As a result, a more practical approach to ensuring the integrity of a digital data file is to use a digital signature. Digital signatures are based on the concept of a hash. A hash is a relatively short numerical value that represents a distilled version of the larger digital data file. Methods that perform this distillation are referred to as hash functions or hash algorithms, and hash functions are designed so that a small change in the digital data file will produce a significant change in the calculated hash value. A digital signature is an encrypted version of the hash, and the digital signature is associated with the digital file in some way, such as attaching it to the file header or storing in a database that is indexed by a unique identifier. An image that has been associated with a digital signature in the manner just described is often called a "secure" image. Tampering with the digital data can be detected by recalculating the hash and comparing it to the original hash in the secure digital signature. A benefit of securing images with digital signatures is that the image data itself is in the "clear", that is, unencrypted, which means a secure image can be used like any other image, yet its integrity can be verified at any time.

While encryption and digital signatures allow the integrity of image data to be verified, they do not address the issue of the quality of the image data. Image quality is determined by many factors, including such attributes as resolution, sharpness, dynamic range, noise, and color reproduction. The digital image data that represents a physical medium or scene could be meaningless, erroneous, or artifact-laden for a variety of reasons, such as a scanner that is defective or a camera that is out of focus, for example. In such cases, the techniques for authenticating data as described previously may be of limited value because they may be protecting data that is worthless.

The knowledge that image data is a satisfactory replica of an original physical medium or scene is clearly important. Companies that are responsible for the scanning of important documents for governments, financial institutions, and other concerns may become liable for loss of valuable information if the scanned image quality is insufficient and the original physical documents have been destroyed. Even if the original documents are still available, significant costs may be incurred in rescanning. End users of scanned documents may also be affected by poor quality because of a diminished ability to extract or interpret the information that was contained in an original document. Likewise, law enforcement agencies may be hampered in their identification and prosecution of criminals if surveillance video images have insufficient quality.

In the U.S. banking industry, the Check Clearing for the 21st Century Act ("Check 21") allows banks to move checks electronically, rather than as physical documents, in order to make the check clearance process faster and more efficient. A bank can scan a check and then transmit image data and payment information in lieu of sending the original check. Banks are not required to keep the original check, and it is typically destroyed or "truncated" to reduce maintenance costs. However, banks that scan checks under Check 21 are liable for any financial losses associated with poor quality images.

As a result, image quality is typically assessed at the point of image capture in a Check 21 environment, and the image quality affects the workflow of the electronic check data. For example, a poor quality image may require special handling, which incurs extra costs. A bank that receives a poor quality check image might require the originating bank to rescan the check, or the receiving bank might simply assume liability for the cost of the check if it is a small dollar amount. The result is increased service costs and delays in completing check clearance, as well as the potential loss of good will with customers. Thus, there is significant value associated with the ability to properly assess image quality.

There are various ways to assess image quality. One approach is to have a person review an image for image quality. However, given the tremendous number of images that are produced daily, a human-based quality control solution is not economically viable in many applications. In addition, human error rates may be significant due to various factors, such as fatigue and lack of training.

Another approach to assessing image quality is to use test targets. A test target acts as a reference image, and quality metrics calculated from that reference can provide measures of actual versus ideal performance for a capture device. Quality measurements using known test targets are termed "full reference" measurements. Test targets are often used on an intermittent basis during the operation of an image capture device to determine if the device is performing as expected. However, the intermittent use of test targets doesn't necessarily provide information about the image quality that is achieved for the capture of a particular physical medium or scene. In some applications, it may be possible to include a test target in every image that is captured by a device, but this can be costly and often impractical. Moreover, it still may be the case that quality of the captured medium or scene is not fully reflected in the quality that is determined from the included test target data. For example, an adaptive image processing algorithm that automatically controls image brightness and contrast might not produce the optimal code values for the captured medium or scene because of the background color in the image, while a test target may still be rendered appropriately.

A third approach is to assess image quality directly from the captured image data itself. When the only information that is available to assess quality is the image data, which generally has unknown characteristics, the quality measurement techniques are referred to as "no-reference" methods. An example of a no-reference image quality metric is described in a technical paper entitled "A no-reference perceptual blur metric" by P. Marziliano, F. Dufaux, S. Winkler, and T. Ebrahimi, *Proceedings of the IEEE International Conference on Image Processing*, Vol. III, pp. 57-60, September 2002. The method in this paper computes a blur metric (that is, a loss in sharpness) by identifying vertical edges in an image and then determining the average spatial extent of the edges. The Financial Services Technology Consortium (FSTC), which is a consortium of banks, financial services providers, academic institutions, and government agencies, has investigated a similar no-reference blur metric for Check 21 applications. The FSTC has also investigated a number of other no-reference quality metrics for Check 21 applications, including compressed image file size, document skew angle, and number of black pixels (for a bi-tonal image). A full description of the FSTC quality metrics can be found at the www.fstc.org Internet address (currently www.fstc.org/docs/prm/FSTC_Image_Defect_Metrics.pdf.)

Regardless of the method that is used to assess image quality, it is advantageous to have the image quality measures secured against possible tampering because of the previously discussed economic, liability, and legal issues that are associated with image quality. Moreover, at various points in the lifecycle of a digital image, it may be desirable to check quickly on the image quality without having to perform another visual inspection or computer analysis of the image data. This capability can be achieved by assessing image quality once (typically at the point of capture) and then securing the quality metrics against tampering. Furthermore, it is desirable to have the secure image quality measures and the secure image data be linked together so that any change in the image data renders the associated quality metrics as invalid.

Current applications that assess image quality, such as Check 21 processing systems, do not secure the image quality metrics and hence are susceptible to tampering of the quality data, which may result in an inefficient workflow and financial losses. It is easy to imagine that a digital scan of a check may be vulnerable to courtroom challenge on the basis of image quality, despite the use of digital signatures for the image data itself by the bank. With secure image quality measures, the liabilities of those parties who are responsible for the scanned data are minimized.

In commonly assigned co-pending U.S. patent application Ser. No. 11/454,673 to McComb, noted earlier, a method is taught for measuring the scanned image quality of documents using test targets and for securing the image quality measurements in combination with secure image data. The document images that are produced by this method are termed "assured documents". Image quality metrics are calculated from test targets that are periodically inserted into a document queue, and these metrics are associated with the scanned image data for user documents that are in the same document queue. If the quality metrics meet predetermined quality specifications, the quality metrics are associated with the image data of an individual user document by combining the quality metrics with a secure hash value that represents a distillation of the image data, followed by encryption of the combined quality metrics and hash value. The encrypted quality metrics and hash value are stored in the file header or filename of the digital document, or by other means, as disclosed in the co-pending application by McComb, to produce an assured document. If the quality metrics do not meet predetermined quality specifications, an assured document is not produced.

In a commonly assigned co-pending U.S. patent application Ser. No. 11/940,347 to Honsinger, et al., noted earlier, improvements are taught for the method by McComb. One improvement is the use of no-reference quality metrics, as described previously, which reduces or eliminates the need for test targets to assess image quality. This is advantageous in applications where test targets are not readily available, economically viable, or otherwise usable.

Another improvement in the method by Honsinger et al. is the concept of an "assured document" is extended to provide for an "assured image", which refers to image data that has been processed so that (1) any tampering with the image data can be detected, (2) the image quality of the image data has been measured and the image quality metrics have been secured, and (3) the image quality metrics are linked to the image data so that any changes to the image data render the image quality metrics as invalid. The secure assurance of all images, regardless of whether their image quality meets predetermined quality specifications, provides increased utility as compared to the assurance of images only when the quality is found to be sufficient, as was the case in the method by McComb. As an example, a digital video image sequence from a police surveillance camera may have some frames that have excellent quality, while other frames in the same sequence have poor quality. However, every frame in the sequence may be essential as evidence, and hence it is imperative to secure the image data and the quality measurements in every frame, regardless of the image quality.

Both the method by McComb and the method by Honsinger et al. use quality thresholds that are applied against individual quality metrics to determine if image quality is sufficient for an intended application. This approach can be problematic with image capture devices that operate in dynamic environments, such as with an outdoor surveillance camera, where weather and lighting conditions will change frequently. Thresholding against individual quality metrics may also result in some images being accepted as having sufficient quality, when in fact a combination of image degradations produces insufficient quality. For example, both sharpness and noise may be within acceptable limits on individual bases, but the combination of these two degradations can result in poor quality.

In addition, both the method by McComb and the method by Honsinger et al. assess image quality according to only two classes, namely, sufficient for, or insufficient for, an intended application. The use of additional quality classes can be beneficial in some applications, but the classification of quality by using multiple thresholds applied to multiple quality metrics is difficult to accomplish in an efficient and robust manner.

As mentioned previously, the method by Honsinger et al. produces an assured image regardless of whether the image quality was assessed to be sufficient or insufficient. However, the assessed quality class is not included as part of the secure assurance data, which can be inconvenient and computationally inefficient as it requires the secure quality metrics to be reevaluated any time the assessed quality class is required.

Thus, there is the need for a method to (i) robustly and efficiently assess the image quality of image data without relying on thresholding of individual quality metrics, (ii) provide for quality assessments with an arbitrary number of quality classes, and (iii) secure the assessed quality class information when forming an assured image.

SUMMARY OF THE INVENTION

The present invention is directed to overcoming one or more of the problems set forth above. The present invention provides a method for assessing the image quality of image data comprising:
  acquiring image data;
  segmenting the image data into at least one spatial region;
  obtaining a plurality of image quality measures for the at least one spatial region;
  forming at least one quality vector that comprises two or more quality measures for the at least one spatial region; and
  classifying the at least one quality vector into one of a plurality of predefined quality classes.

ADVANTAGEOUS EFFECT OF THE INVENTION

It is advantage of the method of the present invention that it computes image quality measures from image data and efficiently assigns the image data into predefined quality classes using the image quality measures.

It is another advantage of the method of the present invention that the quality measures and assigned quality classes for an image are secured so they can be easily and quickly verified at any time.

It is another advantage of the method of the present invention that the image data is secured so the integrity of the digital image can be verified to detect tampering.

It is another advantage of the present invention that the secure quality measures and quality classes are linked to the secure image data so that any changes to the image data render the quality measures and quality classes as invalid.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

FIGS. 13A and 13B illustrate an example of mapping of an input space to a feature space using a nonlinear function.

DETAILED DESCRIPTION OF THE INVENTION

In the disclosure that follows, it is to be understood that elements not specifically shown or described may take various forms well known to those skilled in the art.

The invention is directed to forming a digital file from image data generated by digitization of a physical medium or a physical scene. The physical media may, for example, include any of various types of written, printed, or imaged records such as bank checks, X-ray film, photographic film, historical letters, scholarly papers, photographs, income tax forms, and book or periodical pages, for example. Physical scenes include any physical entity or entities, such as people, places, and objects, for example, that have been imaged onto an image capture device. Embodiments of the present invention encompass image data from any manner of digital image capture device. Some types of image capture devices pass physical media over one-dimensional (1-D) line sensors (such as a scanner or fax machine) to construct a two-dimensional (2-D) image data representation. Other imaging devices use a 2-D sensor (such as a digital camera) to directly produce a 2-D image data representation of a physical media or scene. The image data may also include a sequence of digital images, such as those produced by a video camera, where each frame of the image sequence is treated as a separate image for the purpose of the present invention.

The terms "quality metric" and "quality measure" as used herein are interchangeable and describe some measurable characteristic of image quality that can be obtained from analysis of the digital image data. Thus, a quality metric or quality measure can be a characteristic such as dynamic range, brightness, noise, entropy, or other parameter that can be ascertained using any of a number of techniques that are familiar to those skilled in the image analysis arts. The term "plurality" has its conventional meaning, that is, equivalent to "two or more".

The present invention assigns the image quality measures into one or more quality classes that are taken from a set of predefined quality classes, for example, "excellent, good, fair, poor, or unacceptable". The assigned quality classes, along with the quality metrics, can be secured to produce an assured image, as defined previously, for subsequent use in an imaging system. The distinction between the image quality metrics and the quality classes is that the metrics represent measurable properties of the image data, while the quality classes describe the suitability of the image data for its intended applications.

Figure 1:
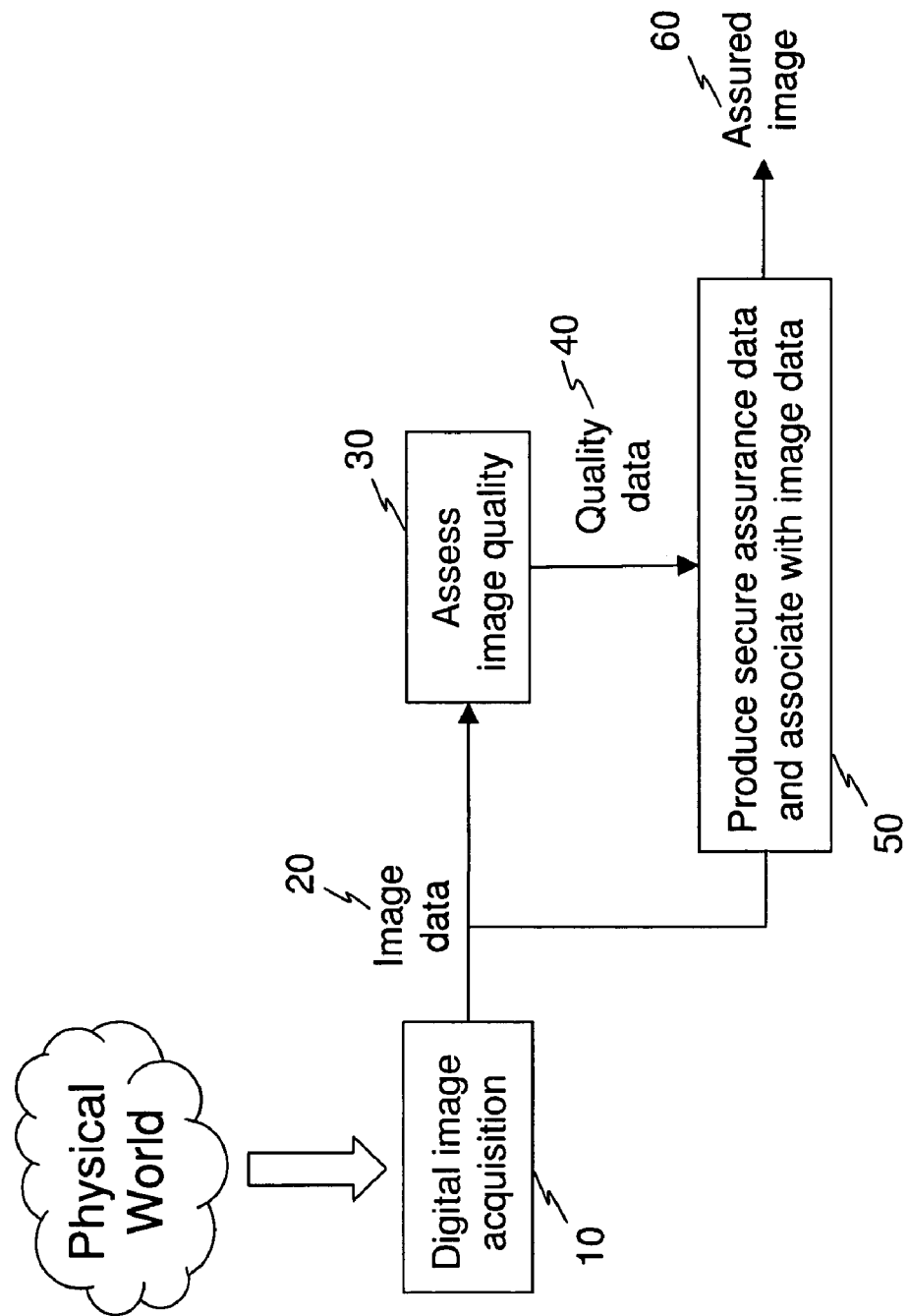
FIG. 1 is a block diagram overview of the image processing workflow for producing assured images with embodiments of the present invention.

Referring to FIG. 1, an example of the formation of an assured image in the context of an overall imaging system is shown. An entity in the physical world, whether a piece of media, an object, a person, or a scene, is captured by a digital imaging device, such as document scanner, digital still camera, digital video camera, or motion picture film scanner, for example, in a digital image acquisition step 10 to produce image data 20 that is representative of the physical entity. An image quality assessment process 30 receives image data 20 and produces quality data 40. Image data 20 and quality data 40 are then secured in a secure assurance data production and association process 50 to produce an assured image 60.

Figure 2:
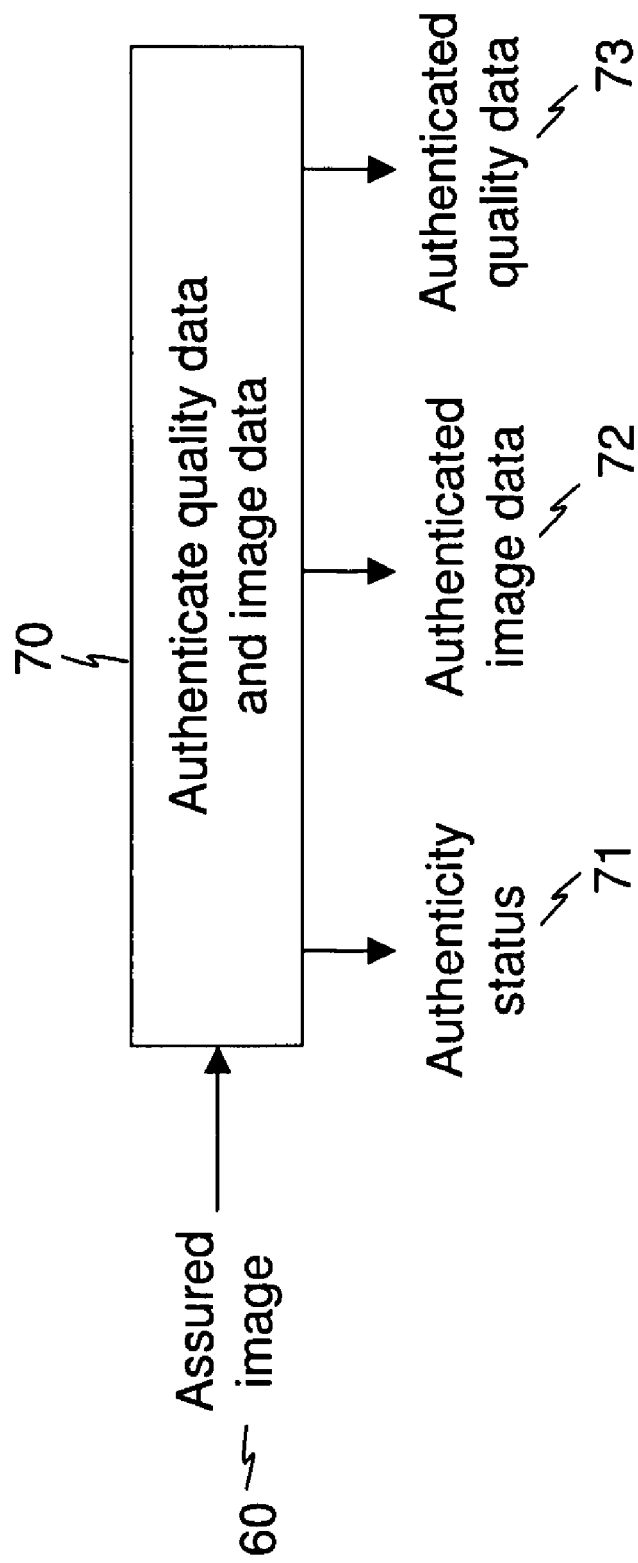
FIG. 2 is a block diagram overview of the image processing workflow for authenticating assured images with embodiments of the present invention.

Referring to FIG. 2, an example of the authentication of an assured image in the context of an overall imaging system is shown. In this example, assured image 60 is sent to an authentication process 70. The assured image is analyzed within the authentication process to determine if any tampering has been done to the image data or the quality data. The authenticity (or lack of authenticity) is indicated by an authenticity status signal 71 that is produced by the authentication process. If an assured image is authentic, authentication process 70 produces authenticated (that is, non-tampered) image data 72 that can be used in any manner of image processing applications, including viewing by a person or automated analysis by a computer. Authenticated quality data 73, consisting of authenticated image quality metrics and authenticated assigned quality classes, are also produced for use in various applications.

Image Quality Assessment Process

Figure 3:
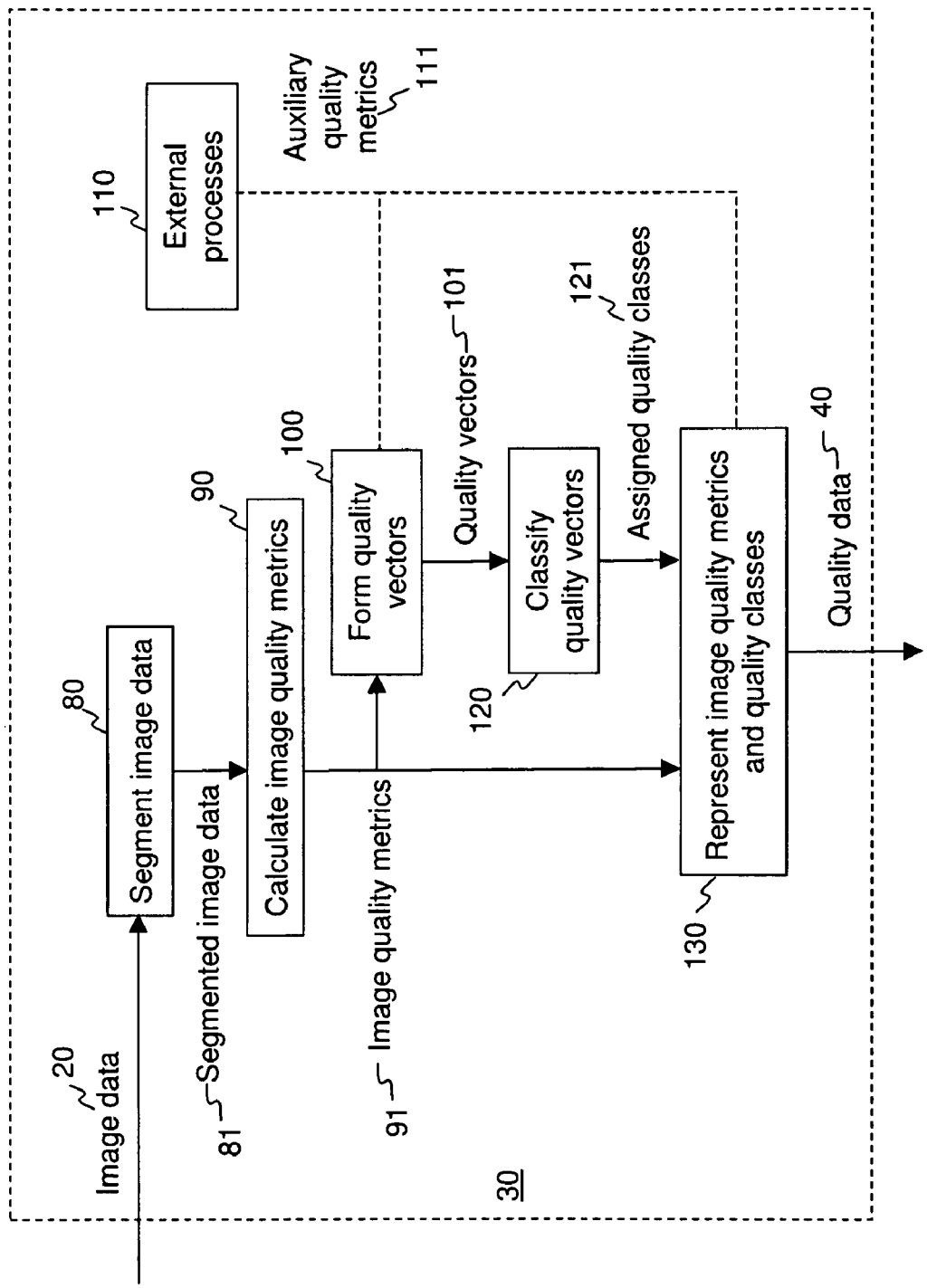
FIG. 3 is a block diagram illustrating an image quality assessment process of the present invention.

Referring to FIG. 3, an embodiment of image quality assessment process 30 is illustrated. The following briefly describes the steps in this embodiment of the image quality assessment process, and additional details are described subsequently.

Image data 20 is sent to an image segmentation step 80, which segments the image data into one or more regions to produce segmented image data 81. The segmented regions contain portions of the image data corresponding to spatial regions on the digital image.

Segmented image data 81 is sent to an image quality metrics calculation step 90, where one or more quality metrics 91 are calculated for each segmented region. These quality metrics typically are no-reference quality metrics because the only data that is available is the image data itself, without any reference image data such as would be provided by test targets.

Image quality metrics 91 are formed into one or more quality vectors 101 using a quality vector formation step 100. A quality vector is an ordered list of at least two image quality metrics, where the ordering has been predefined. For example, a three-dimensional quality vector might consist of a noise metric as the first element, a blur metric as the second element, and an average code value as the third element. A segmented image region can have one or more quality vectors, depending upon the quality metrics that have been calculated for that region, and different segmented image regions may have different image quality metrics and different quality vectors. Quality metrics from different segmented image regions may also be combined to form one or more quality vectors.

Auxiliary quality metrics 111, produced by external processes 110, may also be sent to quality vector formation step 100 and included in the quality vectors as additional vector components. Auxiliary quality metrics describe characteristics and conditions that are related to image quality, but are not computed from the image data itself; rather, auxiliary quality metrics are produced instead by processes that are external to the image data. Auxiliary quality metrics are described in more detail subsequently.

Quality vectors 101 are then sent to a quality vector classification step 120, where each quality vector is classified into one of N (N>1) predefined quality classes, to produce one or more assigned quality classes 121. As mentioned previously, the quality classes describe the suitability of the image data for its intended application. The assigned quality class can be a binary value (for example, quality is "acceptable" or "not acceptable" for the intended application), a multilevel value (for example, quality is "excellent", "good", "fair", "poor", or "unacceptable"), or even a range of numerical values (for example, an integer number between 0 and 100).

Finally, image quality metrics 91, auxiliary quality metrics 111 (if used), and assigned quality classes 121 are sent to quality data representation step 130 to produce quality data 40.

Image Segmentation

Still referring to FIG. 3, the purpose of image segmentation step 80 is to identify spatial regions that have characteristics that are of particular interest and meaningful for assessing image quality. For example, an image might contain two types of content: text and photographs. The various quality metrics that are determined from the image data, such noise levels, sharpness, and code value histograms, for example, may be quite different for the text and photograph regions of an image. By comparison, an image quality calculation that uses the image data for the entire image may not as readily indicate important changes in image quality. In addition, some quality metrics are not meaningful for certain types of image regions, for example, a sharpness metric is not relevant for a bi-tonal image.

Segmentation can provide any of a number of subsets of the image data, including the full set of image data, encompassing the entire image where necessary. Segmented regions can be spatially overlapping, non-overlapping, contiguous, or not contiguous. Moreover, the union of all segmented regions need not necessarily encompass the entire document. Segmentation can be based upon the characteristics of a region or on specific physical location within the document. Regions may or may not be rectangular.

Figure 4:
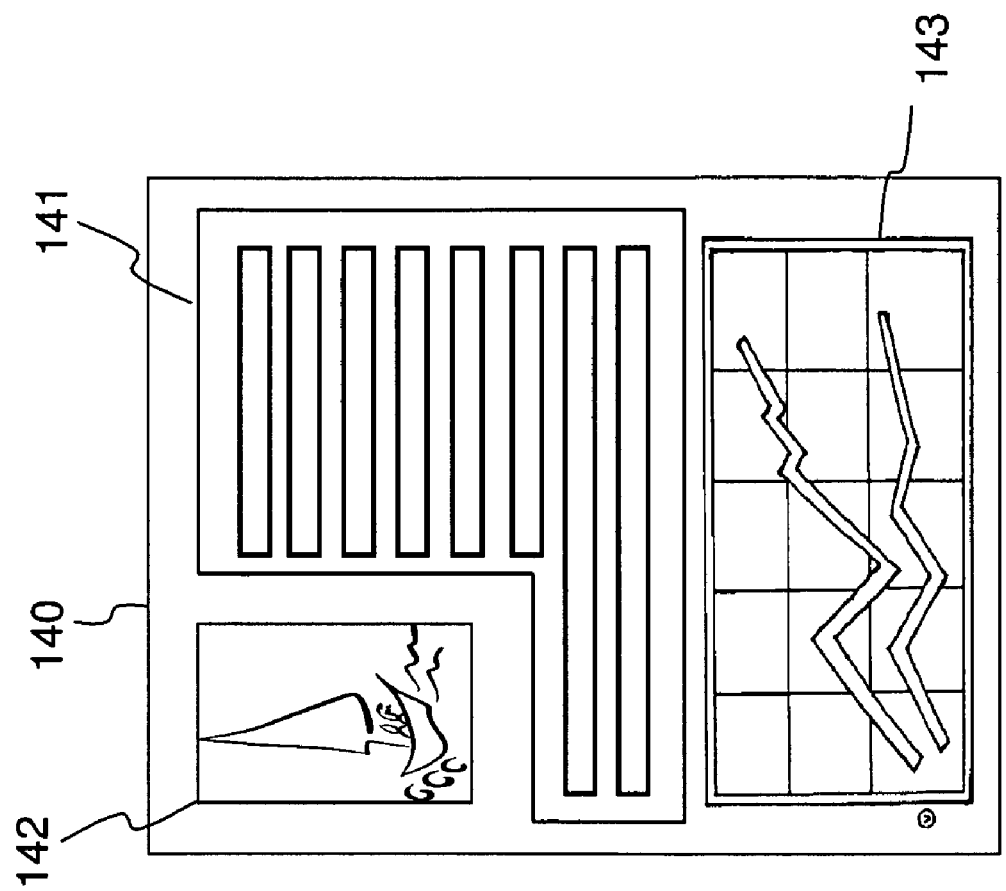
FIG. 4 is an example of spatial regions in a compound document image.

By way of example, FIG. 4 illustrates an example of a compound document image 140 that includes regions of various types. Compound document image 140 includes a text region 141, a photograph region 142, and a graphics region 143. In this example, the regions that are used to calculate quality metrics could include the entire document 140, text region 141, photograph region 142, and/or graphics region 143, or portions of one or more of these regions.

Automated methods for performing this type of segmentation within compound documents are well known to those skilled in the art. One example of a technique for performing such segmentation is described in U.S. Pat. No. 5,767,978, by Revankar et al., entitled "Image segmentation system". In this patent and in the example of FIG. 4, the segmented regions are based on rectangular blocks of pixels, which is generally a convenient arrangement. However, it is noted that the regions may also have arbitrary shapes that can be determined using any of a wide range of segmentation techniques that have been described in the literature and are familiar to those skilled in the image processing arts.

Another example of a segmentation technique is found in U.S. Pat. No. 6,611,622, by Krumm, entitled "Object recognition system and process for identifying people and objects in an image of a scene", which teaches a method for isolating people or objects within the frames of a video sequence. Calculating quality metrics, such as sharpness or noise, within the spatial regions that correspond to the people or objects can be beneficial because these elements are typically important in surveillance applications. The segmentation method by Krumm could also be applied to individual still-frame images.

Figure 5:
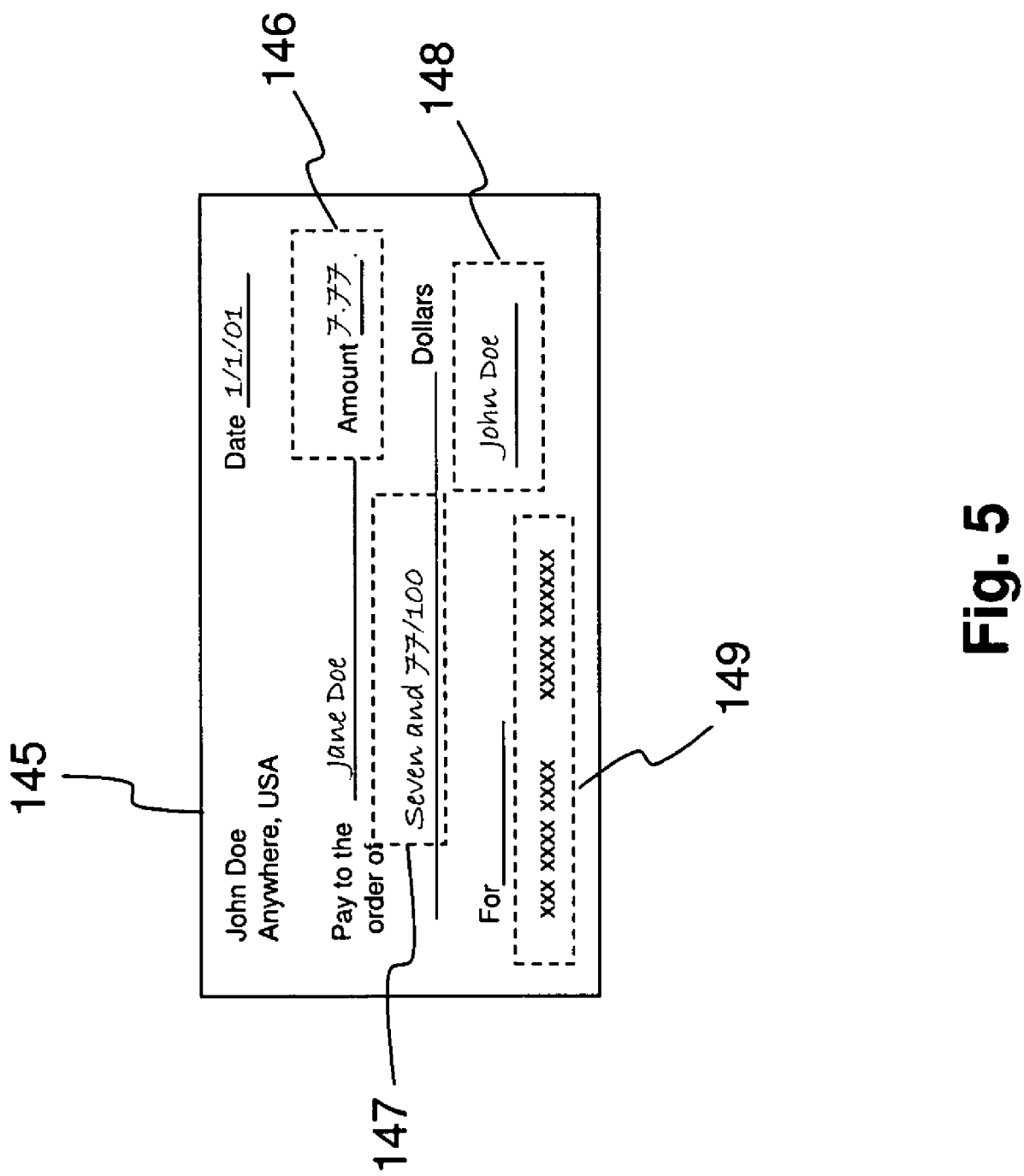
FIG. 5 is an example of spatial regions in a bank check image.

Segmented regions within images may also have fixed or predictable positions. FIG. 5 illustrates an example of a bank check image 145 that includes a convenience amount region 146, a legal amount region 147, a signature region 148, and a MICR (Magnetic Ink Character Recognition) region 149. For this type of document, these regions are largely fixed in position, and the segmentation might be performed by simply specifying coordinates of the regions within the scanned document image. Each of these regions on a bank check may have varying importance to a financial institution, as well as having different characteristics for symbols or characters, such as handwritten characters versus machine characters. Where such differences exist, it may be advantageous to determine the image quality of each region separately, using different quality measures appropriate to the characteristics of the regions.

Image Quality Metrics

One example of a no-reference image quality metric is the previously mentioned blur metric that is found in the article "A no-reference perceptual blur metric", noted earlier. Other examples include the quality metrics for Check 21 applications, described previously. These Check 21 quality metrics are primarily quality measures that indicate whether or not certain defects are present such as "image too light", "image too dark", "excessive document skew", and "horizontal streaks present in the image". Other examples of no-reference image quality metrics include the following:
  (i) dynamic range (for example, computed from maximum image code value−minimum image code value);
  (ii) average brightness (for example, computed from the average image code value);
  (iii) noise (for example, computed from the code value variance in flat image regions);
  (iv) entropy (calculated from the code value histogram); and
  (v) colorfulness (e.g, calculated from the code value distribution along color axes).

Other suitable no-reference metrics could also be used with the present invention. The computation of relevant no-reference image quality metrics is currently an active research area in academia and industry, and the present invention can easily take advantage of any advances in the field.

Quality Vectors

A quality vector is an ordered list of M image quality metrics, where the number of quality metrics is two or more ($M \geq 2$). The use of quality vectors when assessing image quality allows a number of quality metrics to be evaluated simultaneously, instead of evaluating each quality metric separately against a corresponding quality specification.

Figure 6:
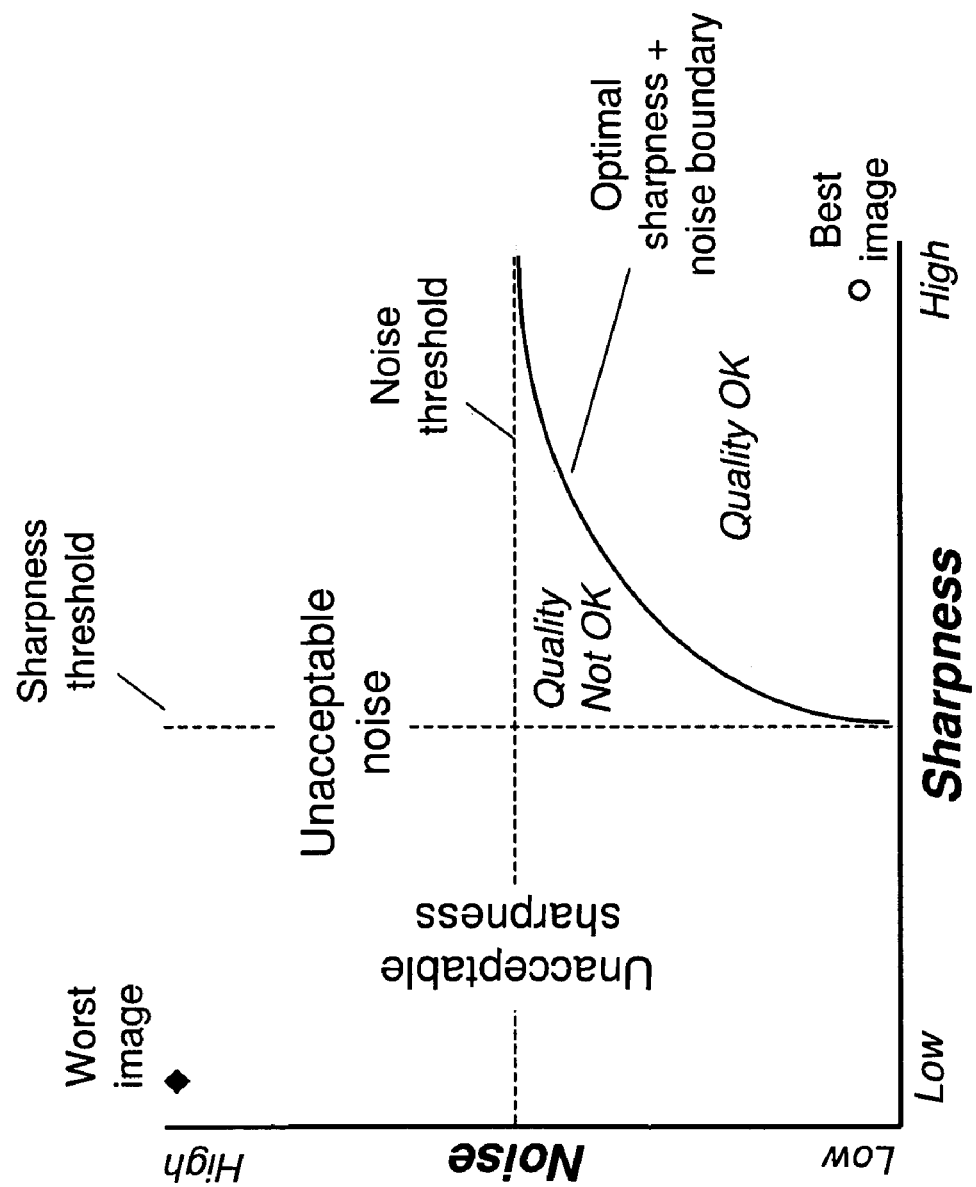
FIG. 6 illustrates a comparison of individual thresholding of quality values for sharpness and noise versus an optimal sharpness+noise boundary.

The benefit of quality vectors is illustrated in FIG. 6, where an example is shown for a quality vector consisting of two quality metric values (that is, $M=2$), one for noise and one for sharpness. The best quality image will be achieved with high sharpness and low noise, which is indicated in FIG. 6 by an open circle in the lower right. The worst quality image is achieved by high noise and low sharpness, which is indicated in FIG. 6 by a black diamond in the upper left. In this example, the goal is to classify an image that falls between these two extremes of quality into the classes of "acceptable" and "unacceptable" quality. Using thresholding of individual quality metrics, any image that has a sharpness value below a sharpness threshold has unacceptable sharpness, and any image that has a noise value above a noise threshold has unacceptable noise. These two thresholds define four quadrants, and only images with sharpness and noise values in the lower right quadrant pass both threshold tests.

However, it is likely that some combinations of sharpness and noise may pass both threshold tests, yet still be unacceptable because the two degradations are not perceived independently, as is well-known in the psychophysical arts. This unacceptable quality region is indicated in FIG. 6 by the area marked "Quality not OK" in the lower right quadrant. Advantageously, through the use of quality vectors and an appropriate classification method, described subsequently, both quality attributes are considered simultaneously rather than independently, and an optimal "sharpness+noise" boundary can be determined as shown by the curved line in FIG. 6. This leads to improved discrimination in the quality classification process as compared to the use of independent threshold tests.

Figure 7:
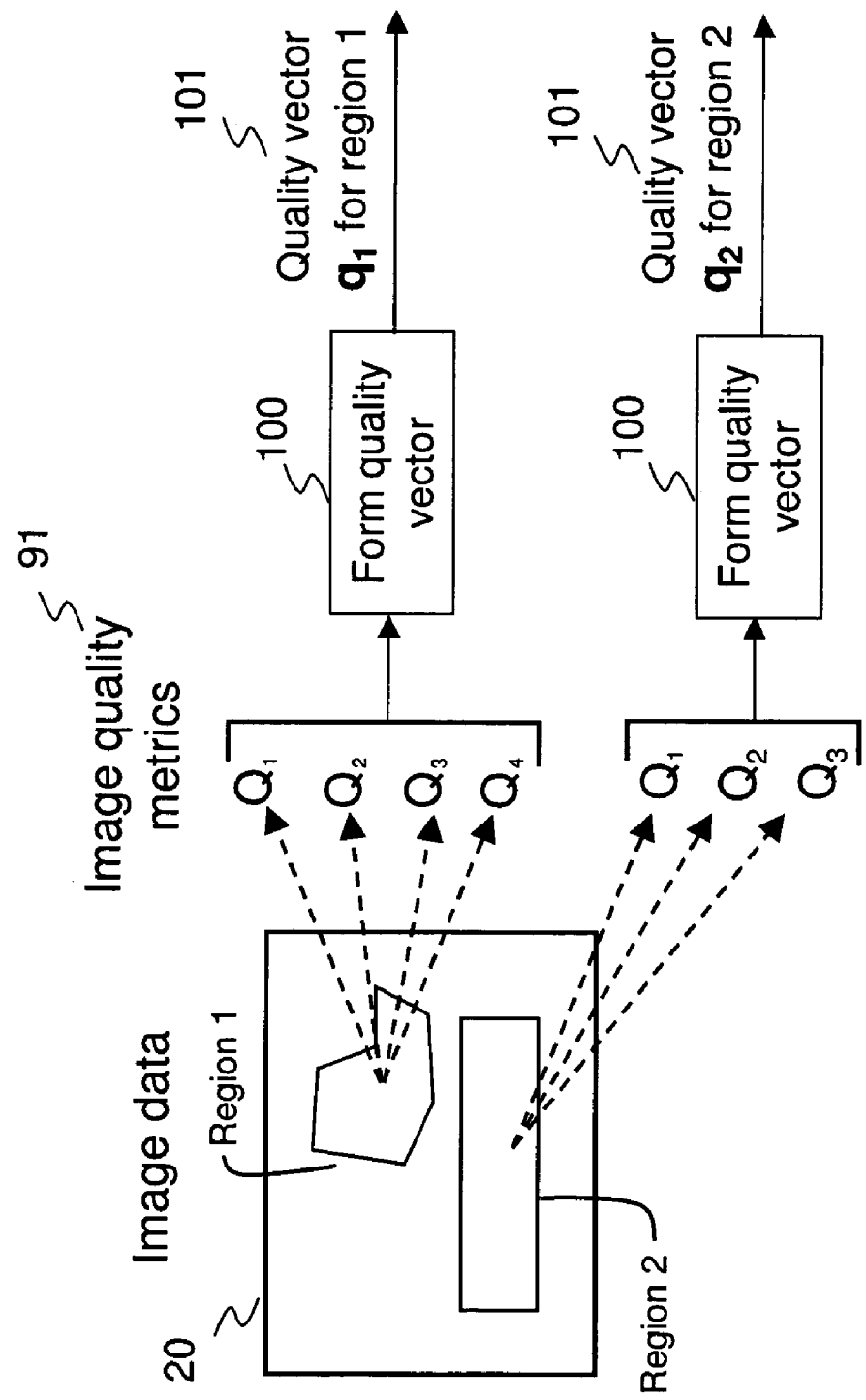
FIG. 7 illustrates an example of the formation of multiple quality vectors, corresponding to different image regions.
Figure 8:
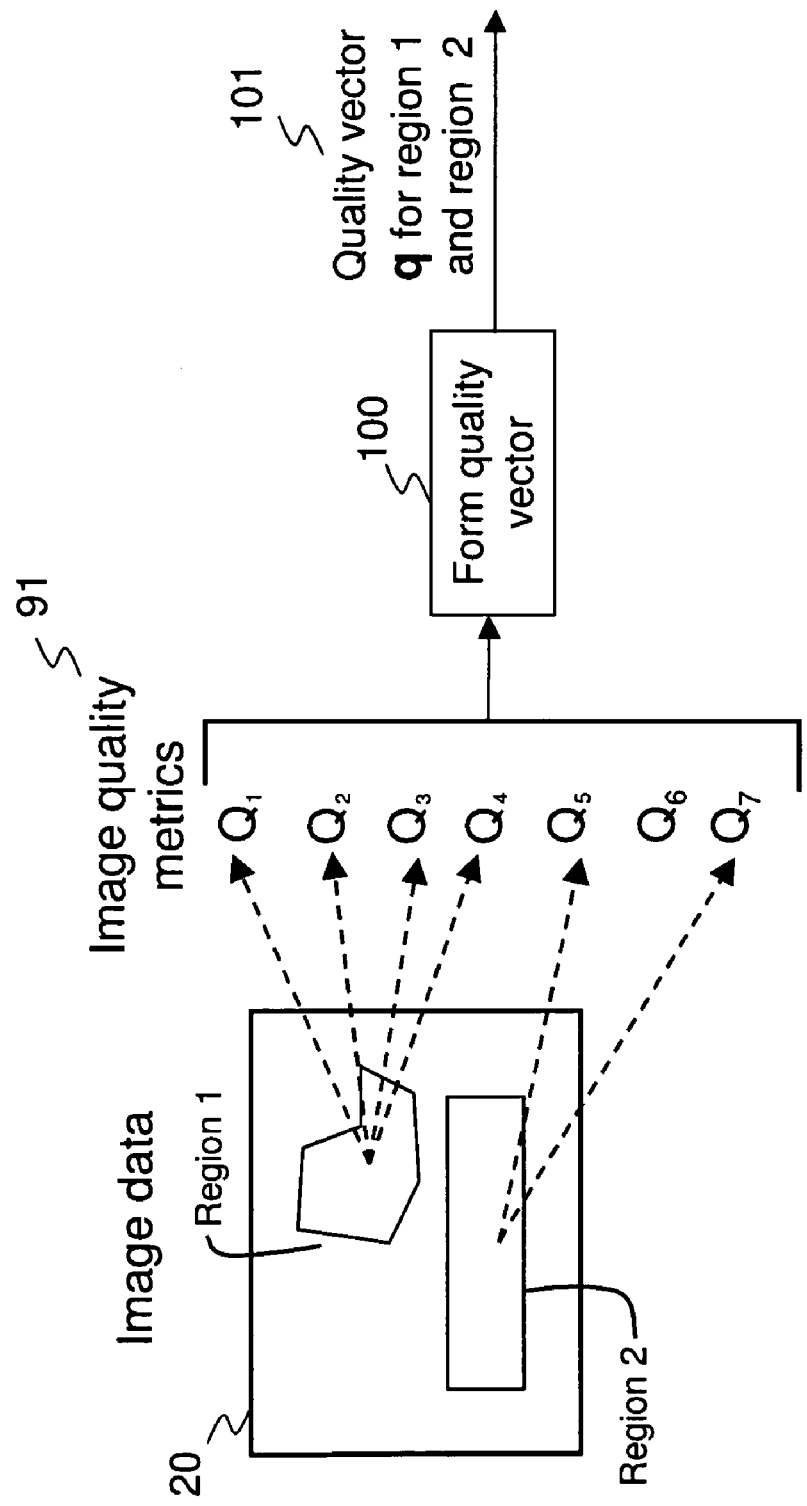
FIG. 8 illustrates an example of the formation of a single quality vector from quality metrics from two image regions.

One or more quality vectors are formed using the quality metrics that were calculated for each region. An example of the formation of quality vectors is illustrated in FIG. 7 for image data 20 that has been segmented into two spatial regions, denoted as region 1 and region 2. Region 1 is represented by quality vector $q_1$ with four quality metrics $Q_1$, $Q_2$, $Q_3$, and $Q_4$, and region 2 is represented by quality vector $q_2$ with three quality metrics $Q_1$, $Q_2$, and $Q_3$. Other quality vectors can be formed by combining the quality metrics for different regions as illustrated by the example in FIG. 8, wherein quality vector q is formed by combining seven quality metrics $Q_1, Q_2, \ldots, Q_7$ from regions 1 and 2. Additionally, it is possible to form more than one quality vector from a single image region as illustrated by the example in FIG. 9, wherein two quality vectors $q_1$ and $q_2$ are both formed from the quality metrics in region 1, with $q_1$ having three quality metrics $Q_1$, $Q_2$, and $Q_3$, and $q_2$ having four quality metrics $Q_4$, $Q_5$, $Q_6$, and $Q_7$.

Figure 9:
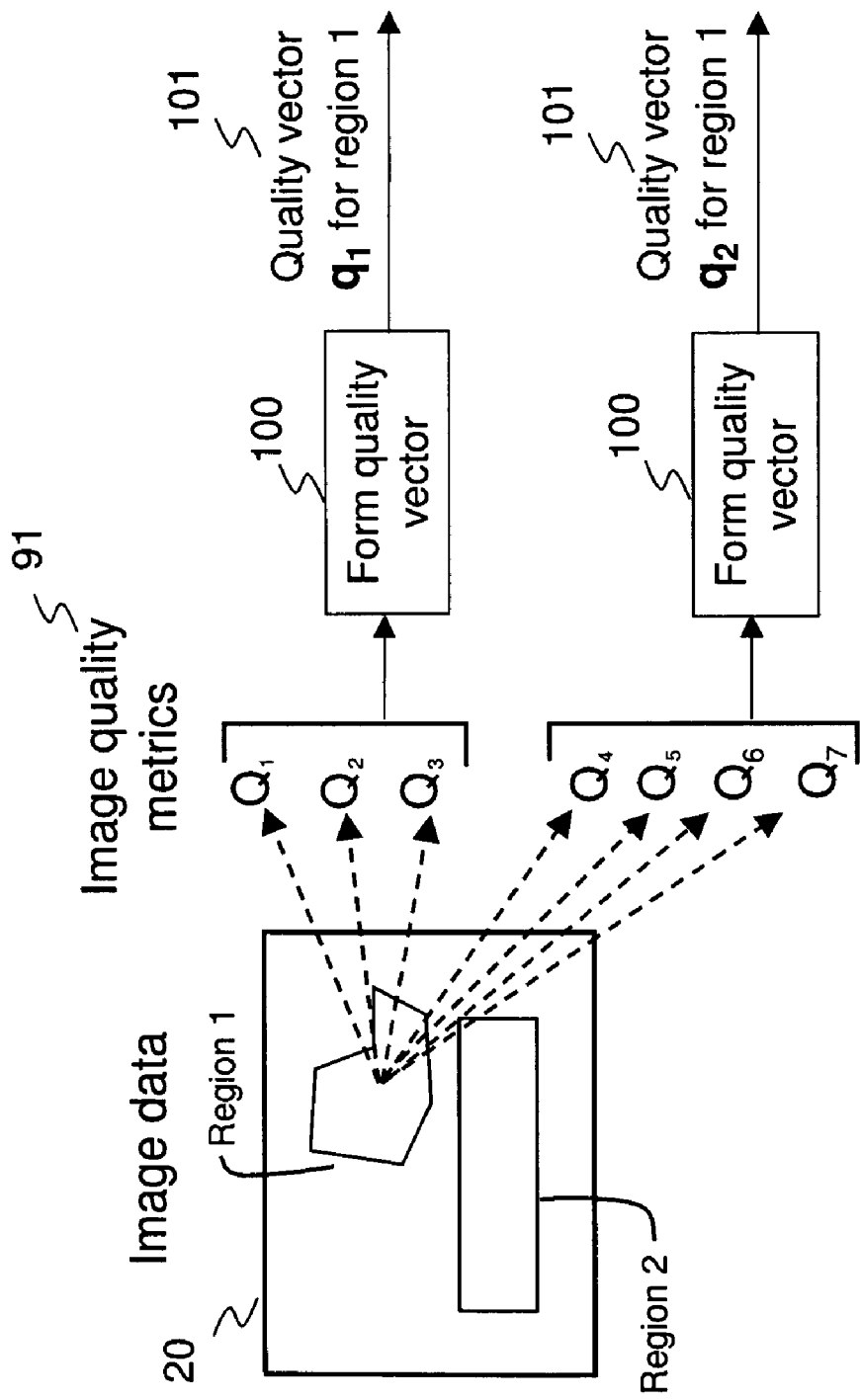
FIG. 9 illustrates an example of the formation of two quality vectors from quality metrics from a single image region.

The choice of quality vectors for individual image regions or for combined regions depends upon the nature of the classification that is to be subsequently performed. For example, a user may wish to separately classify two different regions as having either "acceptable" or "unacceptable" quality using various quality metrics, where one region corresponds to text and the other region corresponds to a continuous-tone photograph. These two types of regions may likely have different image quality metrics and perhaps different meanings for the quality classes of "acceptable" and "unacceptable"; and separate quality vectors and separate quality classifications are desirable in such a case. Alternately, however, a user may also desire to provide an overall quality classification for all regions in an image, which can be accomplished by combining the individual quality vectors to form a combined quality vector as in FIG. 8 and then subjecting the combined quality vector to a classification process with quality classes that have been defined for the entire image. As yet another example, a user might want to classify the image quality of a single image region according to two or more different uses, such as whether an amount field in a bank check is "usable" or "not usable" for the purpose of optical character recognition (OCR) and also whether the same amount field is "legible" or "not legible" under human inspection. In this case, two different quality vectors may be required for the same image region as illustrated in FIG. 9.

Quality Vectors With Auxiliary Quality Metrics

Another embodiment of the image quality assessment process of the present invention includes using additional vector components in the quality vector as a means of improving the robustness of the classification step. These additional quality vector components, termed auxiliary quality metrics, represent auxiliary information that is produced by processes that are external to the image data itself but relate to the imaging process and thus to overall image quality. Auxiliary quality metrics include values not computed from the image data itself.

Figure 10:
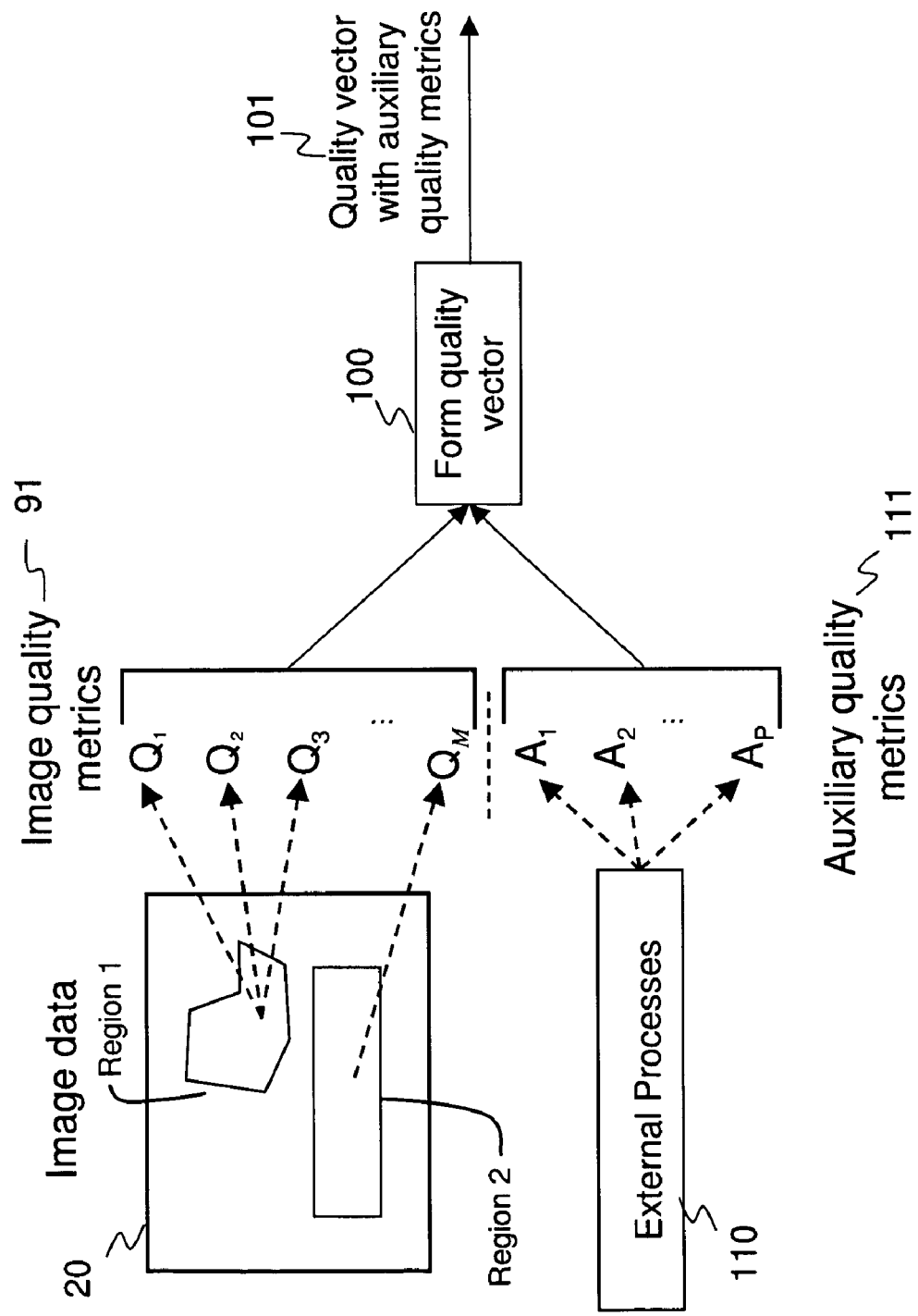
FIG. 10 illustrates an example of the formation of a quality vector using image quality metrics and auxiliary quality metrics from information produced by external processes.

Referring to FIG. 10, an example of the formation of a quality vector with auxiliary quality metrics is shown. In this example, a set of M image quality metrics 91, denoted as $Q_1$, $Q_2$, ..., $Q_M$, are calculated from image regions 1 and 2 within image data 20. External processes 110 also provide P auxiliary quality metrics 111, denoted as $A_1$, $A_2$, ..., $A_P$. The auxiliary quality metrics 111 are combined with image quality metrics 91 in a predefined order in the quality vector formation step 100 to produce a quality vector 101 with auxiliary quality metrics. In the case of a quality vector that is formed with both image quality measures obtained from the image content and auxiliary quality metrics obtained from external processes, it is sufficient that there be a total of at least two metrics (in the example given here, to satisfy $M+P \geq 2$) in order to form a valid quality vector. If auxiliary values are used as part of the quality assessment process, they are also included in quality data 40, as shown in FIG. 3.

As an example of the use of auxiliary quality metrics, a process is described in the co-pending application by McComb that uses test targets to provide quality metrics that are representative of the performance of a digital image capture device, although an individual image may not achieve this level of quality performance because of its unique attributes as described previously. However, if the image quality of test target data is poor because of reduced performance of the capture device, it is highly likely that the image quality of other image data produced by the capture device will also be poor. Thus, the auxiliary quality metrics from the test target data provide a general indicator of the quality that can be achieved by the image capture device, and this information can be used to improve the robustness of the quality classification of the image data. This is accomplished by forming the quality vector using the combination of the auxiliary quality metrics from the test target and the image quality metrics for image data that does not include the test target.

Besides the use of image quality metrics from test target images, other auxiliary quality metrics could include other information that relates to performance of the image capture device, either in general or under specific imaging conditions. For example, this can include the number of images produced by the digital image capture device since its last calibration. This metric, although not directly related to image data content, can be relevant for image quality. For example, if a large number of images have been produced by a high-speed scanner, it is possible that quality is reduced due to mechanical component wear. Another example of an image quality measure in this auxiliary quality metrics category is a time stamp corresponding to when the image data was captured by the digital image capture device (for example, if a surveillance camera is operating at night, the image quality is likely to be lower). Other auxiliary quality metrics can include the time duration since previous image data was captured by the digital image capture device (for example, if there is a large delay between image captures, it may be related to a problem with the capture device, or it might imply that a new queue of documents is going to be scanned and they might have different properties than the previous queue); the local weather conditions at the time that the image data was captured (for example, foggy conditions would lead to lower quality with an outdoor surveillance camera); an indicator of the physical status of the digital image capture device (for example, a fluctuating power supply voltage that could lead to poor capture quality, or a temperature sensor that indicates excessively high or low temperature, which might reduces the performance of the image sensor in the image capture device); or one or more characteristics of a scene or media that is captured by a secondary imaging device (for example, detecting the type of paper that a document has been printed on by using an infrared or multispectral sensor that is separate from the digital image capture device but relates to the performance of the capture device). There are numerous metrics of this type that could be used effectively in the present invention and included in forming the quality vector for an image. An auxiliary quality metric is a variable data element that is obtained from a process that is external to image data processing.

Quality Vector Classification

Referring again to FIG. 3, quality vector classification step 120 accepts two or more quality vectors 101 as input and produces an assigned quality class 121 for each quality vector. For example, the quality classes could use the descriptors "excellent", "good", "fair", "poor", or "unacceptable", which can be assigned the numbers 1 through 5, respectively, to provide an efficient representation when forming the assurance data. Other examples of quality classes include the simple binary case of "acceptable" or "not acceptable" (indexed by the numbers 1 and 2, for example), and the quality classes of "excellent", "usable", or "not usable" (indexed by the numbers 1, 2, and 3, for example) for document and Check 21 applications. The meaning of these quality classes is predefined and depends upon the application.

The classification of vector data is a problem that has been researched extensively in the field of pattern recognition, and numerous approaches have been described in the open literature. In one embodiment of the present invention, the method that is used in the image quality classification step 120 is a support vector machine (SVM). An SVM is a supervised learning technique that can be used to classify input vectors into output classes. The theoretical basis for SVMs has been described in numerous publications and articles. For the present disclosure, it is instructive to review some useful aspects of SVMs.

In an SVM, an input vector x (also called a pattern) consists of a set of values (vector components) that represent some relevant aspects of a process. For example, an input vector that is used for assessing image quality might include quality metric values for the sharpness, noise, contrast, etc. that have been measured in a given image, as well as auxiliary quality metrics as described previously. The goal is to classify the vector x into one of N predefined classes $C_k$, k=1, . . . , N. In the present invention, the N predefined classes could be, for example, the quality classes labeled "excellent", "good", "fair", "poor", and "unacceptable", which can be associated with the class indices k=1, . . . , 5.

Before an SVM can be applied to a classification problem, it must be trained to determine the classification rules. Training is done with a set of training data, which consists of input vectors that have already been associated with one of the predefined classes. The training data consists of L pairs of input vectors and their associated classes, which are usually denoted as $(x_i, y_i)$, i=1, . . . , L, where $y_i$ takes on one of the class values $C_k$. In the present invention, training data would consist of quality vectors that have been produced from segmented regions of training image data, where the segmented regions have been previously classified into one of the quality classes, typically using observer testing. The quality vectors that are part of the training data may also include auxiliary quality metrics.

Given this training data, an SVM calculates the optimal decision boundaries in the input vector space to separate the classes. An SVM is a linear classifier, so the decision boundaries are always hyperplanes. Given the decision boundaries, a newly observed vector x can then be classified by determining where it lies in the vector space relative to hyperplanes.

It is instructive to consider a binary SVM, where there are only two classes, because even a multiple-class problem can be decomposed into a series of binary questions. For example, a series of binary questions might be: "Is the quality excellent or not excellent?"; if not excellent, "Is the quality good or not good?"; if not good, "Is the quality fair or not fair?"; and so on. It is noted that there are other solutions for solving multiple-class SVM problems that have been reported in the literature, and such methods could also be used with the present invention. In the binary case, it is convenient to represent the class variable $y_i$ with the values $\{-1, +1\}$.

Figure 11:
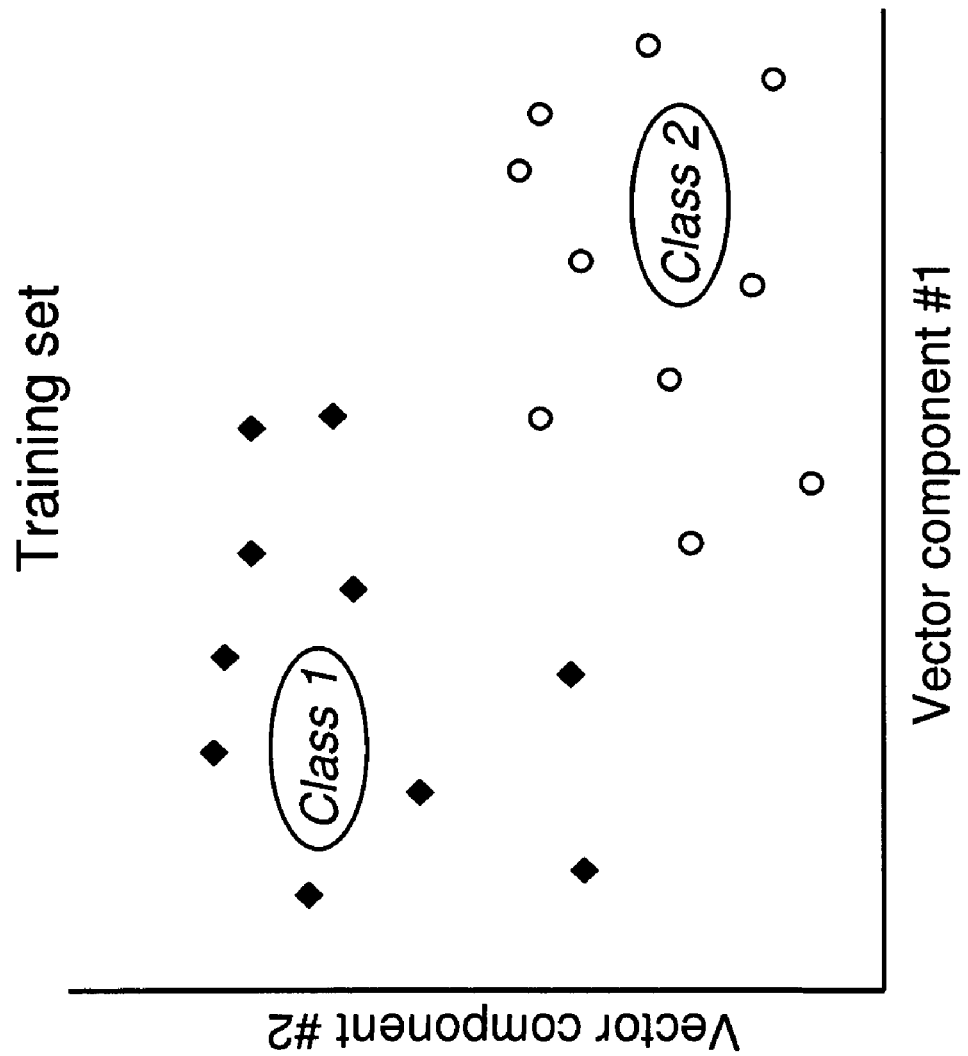
FIG. 11 illustrates an example of a set of training data having two vector components and two classes.

FIG. 11 illustrates an example of a set of training vectors, where each vector has two components, for example, sharpness and noise metrics that are measured from a set of training image data. These training images have been previously classified (by a human observer, for example) into one of two classes, where class 1 is indicated by black diamonds and class 2 is indicated by open circles in FIG. 11. In the case of image quality, these two classes might correspond to (1) quality is not acceptable and (2) quality is acceptable, or they might correspond to the classes associated with one of the previously described binary questions. The goal in an SVM is to find the optimal hyperplane that separates the two classes. In this two-dimensional example, the decision boundary is simply a line.

Optimality in SVMs is defined as calculating the decision boundary for the training data that is maximally distant from the data in both classes. This is known as finding the maximum-margin classifier and involves solving a quadratic programming problem.

Figure 12:
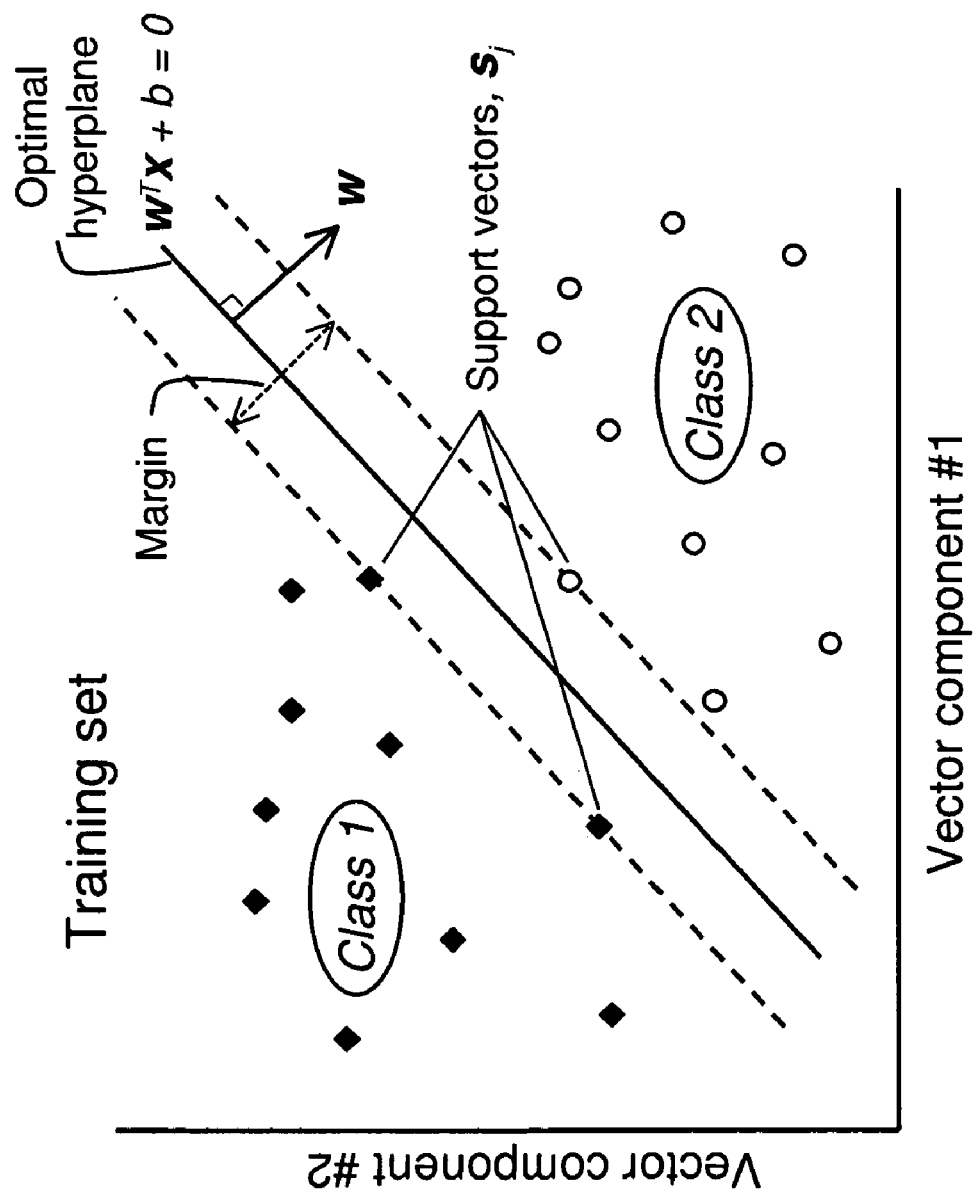
FIG. 12 illustrates an example of an optimal hyperplane and support vectors for a maximum margin classifier applied to a set of training data.

FIG. 12 illustrates an example of a maximum-margin decision boundary for the training data of FIG. 11. The decision boundary is the solid diagonal line and the margin is represented by the two dashed lines that are parallel to and on each side of the decision boundary. Input vectors that lie on the margin boundary are known as support vectors, as denoted in FIG. 12. The support vectors $s_j$, j=1, . . . , S, are the key to determining the decision boundary as only they contribute to the final solution. The linear decision boundary can be represented by the equation $w^T x + b = 0$, where b is an offset term, and w is a weight vector that is perpendicular to the decision boundary, as illustrated in FIG. 12. Given the decision boundary, a vector z that is not in the training set can be classified using the discriminant function $f(z) = w^T z + b$, where it belongs to one class if $f(z) \geq 0$ and to the other class if $f(z) < 0$.

The relationship between the support vectors $s_j$ and the weight vector is given by $$w = \sum_{j=1}^{S} \alpha_j y_j s_j,$$

where the $\alpha_j$ represent weighting factors for the individual support vectors $s_j$. As a result, the discriminant function $f(z)$ can also be written as $$f(z) = \sum_{j=1}^{S} \alpha_j y_j s_j^T z + b.$$

Figure 13B:
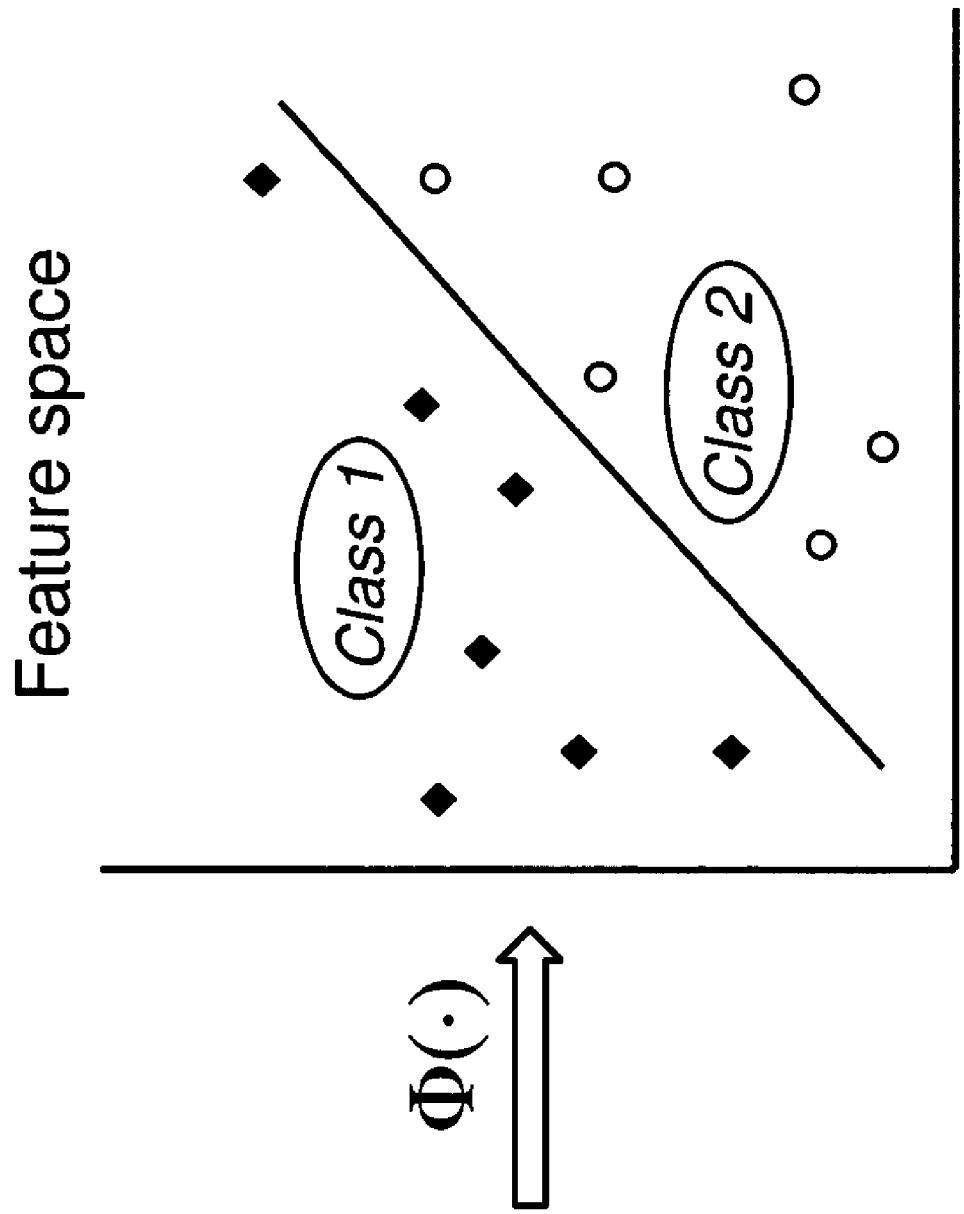

An SVM cannot always cleanly separate two classes of input vectors with a linear decision boundary. FIG. 13A illustrates an example of this situation, where a set of training vectors cannot be separated by a straight line. However, the form of the support vector machine can be changed to allow the input vectors to be nonlinearly mapped from the input space into a "feature" space where a linear separation is possible. The nonlinear transformation from the input space into the feature space denoted as $\Phi(\bullet)$, and FIG. 13B illustrates the training set of vectors after they have been transformed. It is possible for the feature space to be of higher dimensionality than the input space (even to have infinite dimensions), which can quickly lead to computational issues.

However, an important aspect of SVMs is that it is not necessary to explicitly transform the input vectors using the $\Phi(\bullet)$ function. Instead, the "kernel trick" can be employed, where the discriminant function can be represented as $$f(z) = \sum_{j=1}^{S} \alpha_j y_j K(s_j, z) + b,$$

where $K(\bullet)$ is a kernel function. An example of a kernel function is $K(s_j, z) = (s_j^T z + 1)^d$, which is a polynomial of degree d. Another example is a radial basis function kernel $K(s_j, z) = \exp(-\|s_j - z\|^2/(2\sigma^2))$. The kernel function can be viewed as a similarity measure between the support vectors $s_j$ and the observed vector $z$, and the design of optimal kernel functions is an active area of research. For the classification of an image quality vector, an appropriate kernel function can be determined to achieve the optimal boundary. For example, the nonlinear optimal sharpness+noise boundary that was shown in FIG. 6 could be produced using a polynomial kernel function.

In an embodiment of the present invention, the set of training data for an SVM starts with a set of training image data, from which quality metric values are computed and then formed into quality vectors. Typically, the quality metric values are normalized to the range [0, 1] or [−1, +1] to prevent a single quality metric value from dominating the classification problem. The normalizing value is a function of the individual quality metrics. The training image data has also been classified previously into one of the N predefined quality classes, using observer testing, for example. The training data can come from a single image capture device, a family of image capture devices, or a wide range of different capture devices, depending upon the degree of discrimination that is needed. In general, it is sufficient to have training data for the selected quality metrics that are representative of the image quality performance of the capture device that is being used in the assurance process. There is an obvious tradeoff between the time that is spent on training data and the precision of the quality classifications.

Given the training data, an SVM is produced that calculates the optimal decision boundary (or boundaries). Once the SVM has been constructed from the training data, it can be used in the quality vector classification step 120 to provide an assigned quality class as part of the assurance process for each image or image region that is provided from an image capture device. Also, as described previously, there maybe multiple quality vectors, and an SVM classifier must be determined for each unique type of quality vector and/or predefined quality classes.

Besides the maximum-margin SVM just described, other SVM variations are possible. One useful variation is a soft-margin SVM, where slack variables are introduced into the optimization of the decision boundary so that the training data may not be entirely separated into the proper classes. This approach is advantageous with noisy data (for example, quality metrics that are noisy) and can lessen the need for highly complex kernel functions that may overfit the training data. In addition, the present invention is not restricted to SVMs, and other supervised learning techniques, such as neural nets, for example, can be used in a like manner and with the same benefits in the present invention. Furthermore, unsupervised learning techniques, such as principal components analysis and k-means clustering, for example, that do not require training data, can also be used to classify quality vectors within the scope of the present invention.

Representation of Image Quality Metrics and Quality Classes

In one embodiment, the image quality metrics and the assigned quality classes can be represented by simply concatenating data fields of known length in a predefined ordering, for example, 8 bits for the assigned quality class, 32 bits for the first quality metric value, 16 bits for the second quality metric, and so on for the remaining quality metrics in a segmented image region. The number of bits may be different for each quality metric and assigned quality class depending on the type of data that is represented and the precision that is needed to represent the data (for example, short integer, long integer, float, or double). However, because there may be a variable number of image regions and a variable number of quality metrics for each region, a more flexible and more easily interpreted structure is desirable when representing the image quality metrics.

In another embodiment, the image quality metrics and quality class can be compactly represented using key-length-value packing, which is a well-known technique that is used in many image formats for header information and other metadata. The key is defined as a unique identifier for the data that follows the key. The length is defined as the amount of data that follows the key, and the length may vary with the key. Finally, the value is defined as the actual data. Keys are predefined for the quality class and each type of quality metric, and the value includes data that identifies the image region, followed by data for the actual image quality metric or quality class itself. Key-length-value data is usually byte-aligned for ease in parsing the data, so the key, length, and value are always represented with an integer number of bytes. To assist in parsing the data, each key is usually prefixed with a reserved marker, such as the all-ones byte, denoted as "FF" in hexadecimal notation.

Figure 14:
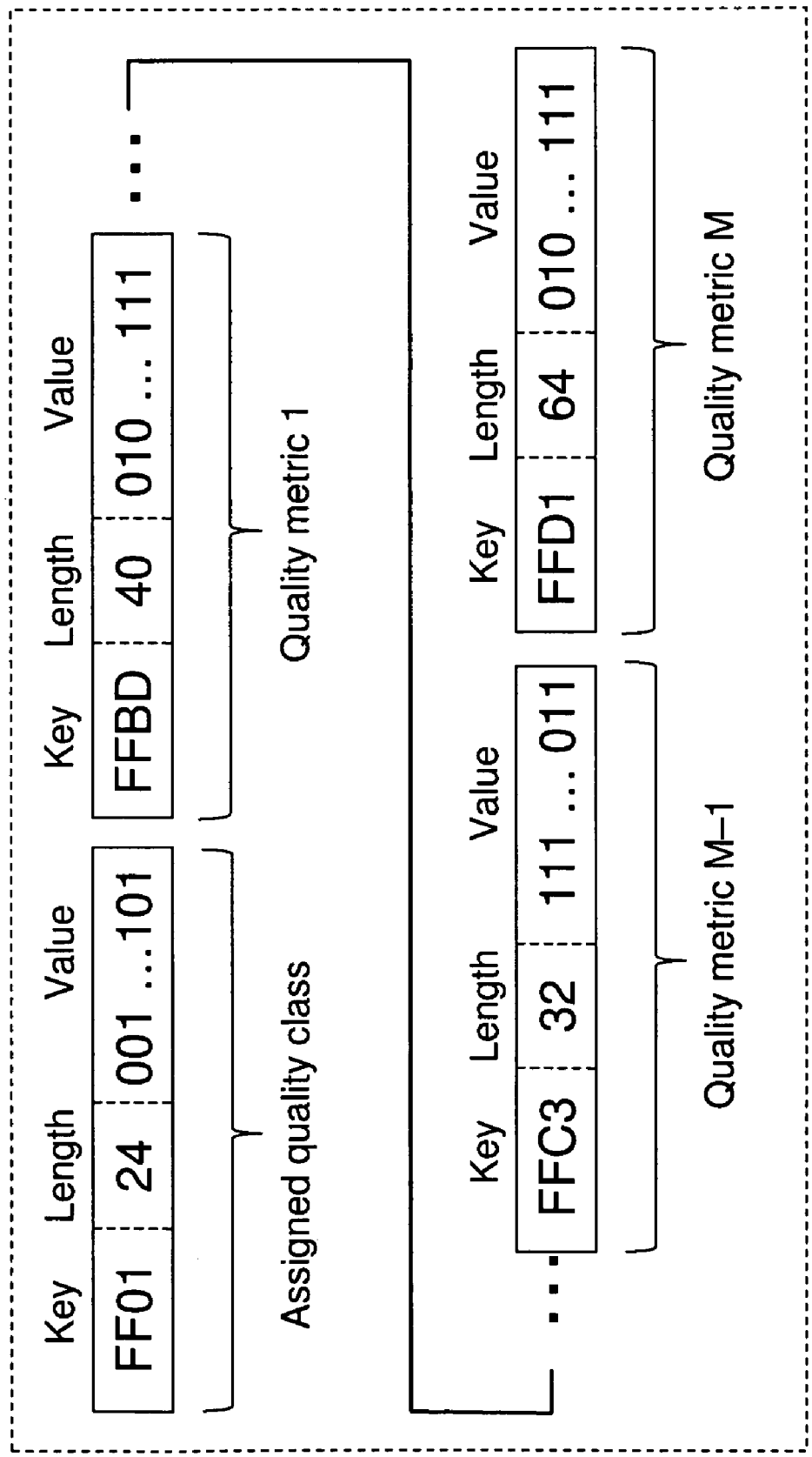
FIG. 14 illustrates an example of representing quality data using a key-length-value packing.

An example of key-length-value packing for quality data is shown in FIG. 14. In this example, an assigned quality class is denoted with the 2-byte key "FF01" (in hexadecimal notation), and the length is 24 bits, which includes two bytes (16 bits) to represent the length parameter plus 8 bits to represent the assigned quality class. However, if only five quality classes (for example, excellent, good, fair, poor, and unacceptable) are used, only 3 of the 8 bits are actually used to represent the five quality classes. The various quality metrics have different lengths depending upon the nature of the quality attribute that they are measuring, and FIG. 14 illustrates three quality metrics out of a total set of M quality metrics, denoted by the keys "FFBD", "FFC3" and "FFD1", with lengths of 40, 32, and 64 bits, respectively. The quality metric values might correspond to a noise standard deviation, a dynamic range, and a sharpness measure, for example. The key-length-value representation can be easily extended to handle any number of image quality metrics and assigned quality classes.

Additionally, it is possible to define various fields within the value portion of a key-length-value grouping. Because there may be a plurality of segmented image regions, each with its own quality metrics, it is necessary to identify the image region that goes with a given quality metric. This can be accomplished by identifying the type of region with a field within the value parameter for a quality metric. For example, the first 8 bits of the value can identify the type of region according to predefined classes such as text, photograph, graphics, bi-tonal, background, and foreground. Alternatively, it may be advantageous to identify the spatial region explicitly by specifying the region position and size, using a predefined coordinate system and description language. Note that the descriptions of the spatial regions can also be accomplished by allocating key-length-value descriptors for each region prior to specifying any quality data, thus defining the regions once within the packed bits of the assurance data for greater data efficiency.

In yet another embodiment, the image quality metrics and quality class can be represented using a general description language such as XML (Extensible Markup Language). XML provides a description framework that can be easily modified to include any number and type of image quality metrics, and the XML representation can be designed for easy readability (in contrast to the key-length-value representation, which requires separate knowledge of the meaning of each encoded key). One tradeoff is that XML representation is not as compact as key-length-value representation, but this is not a significant limitation in practice because the amount of quality data is typically not large relative to the amount of associated image data.

XML representation provides great flexibility in representing quality metrics. For example, it may be advantageous in some applications to include a direct representation of the specific quality vectors that were used for an image, while in other applications, it may be advantageous to use a representation of the individual quality metrics, with or without also including the specific form of the quality vectors.

Related to XML representation is the XMP (Extensible Media Platform) data model that has been defined by Adobe Systems Inc. The XMP data model is aimed specifically at describing metadata that is associated with documents and digital images. It can be serialized (written) as an XML representation, and its extensible framework means that image quality metrics and quality class can be included under the XMP data model by simply defining new elements. Furthermore, an XMP representation can be included in an image file using methods that have been defined by Adobe Systems Inc. For example, an XMP representation of image quality metrics and quality class (as well as other image metadata) can be included in a TIFF image by using the TIFF tag "700", which represents an XML packet within the TIFF header.

Secure Assurance Data Production and Association Process

Techniques for producing secure assurance data from quality data and image data and then associating the secure assurance data with the image data are disclosed in the commonly assigned co-pending application by Honsinger et al. A benefit of the present invention is that the secure assurance data also includes the assigned quality classes, instead of only the quality measures as in the method by Honsinger et al. The following description provides a summary of the secure assurance data production and association process in the method by Honsinger et al., with the additional assignment of quality classes in the secure assurance data.

Figure 15:
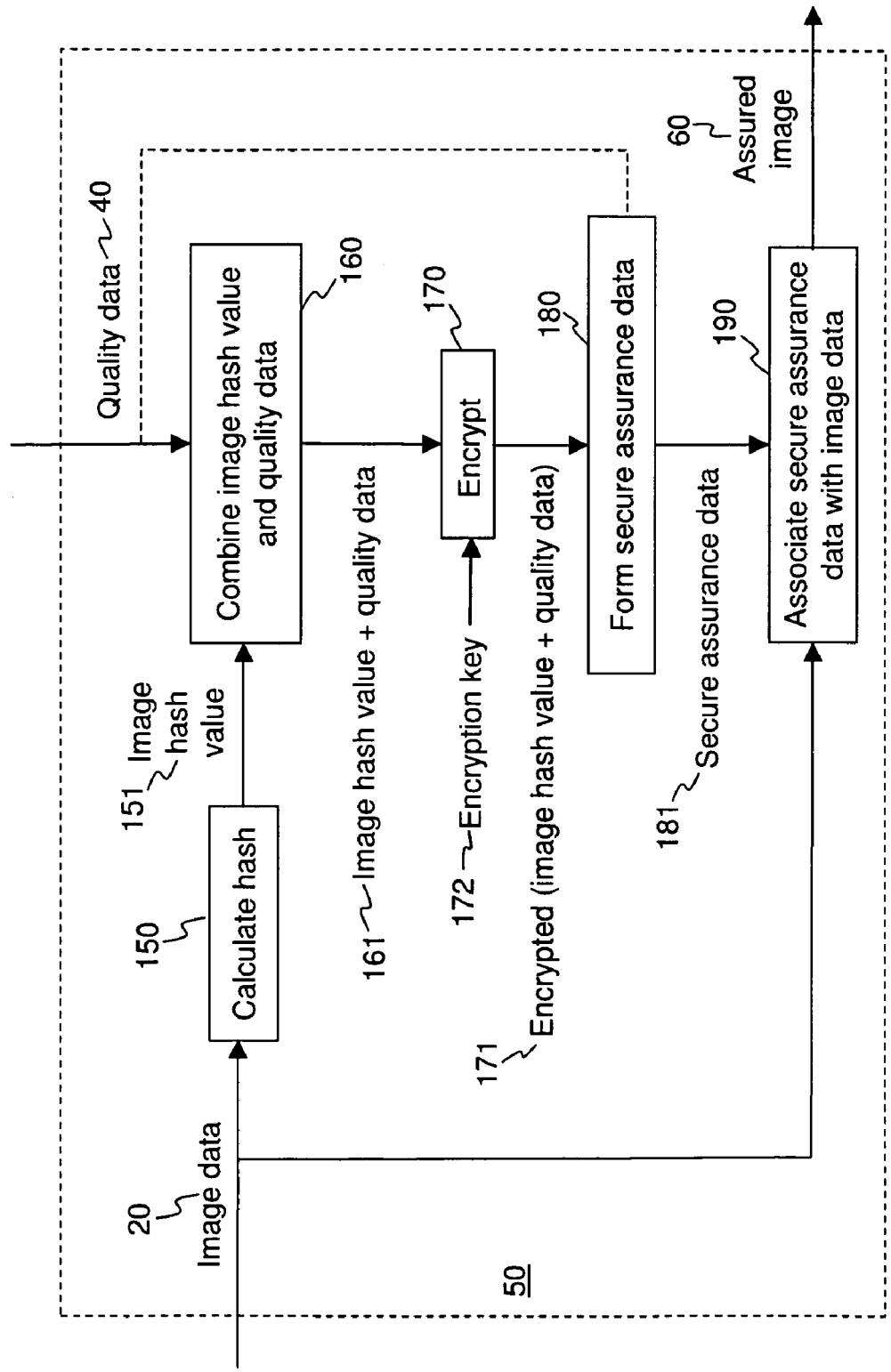
FIG. 15 is a block diagram showing a first embodiment of a method for producing secure assurance data with the present invention.

Referring to FIG. 15, an embodiment of secure assurance data production and association step 50 is illustrated. Image data 20 is sent to a hash calculation step 150, which produces a hash value 151 for the image data. Image hash value 151 and quality data 40 are combined in combination step 160 to produce assurance data 161 that consists of the combined image hash value and quality data. The assurance data is then secured by an encryption step 170 using encryption key 172 to produce encrypted assurance data. Encrypted assurance data 171 can optionally be combined with unencrypted quality data 40 in a secure assurance data formation step 180 to provide convenient access to the image quality metrics and assessed quality classes at any time without the need for a decryption step. The unencrypted quality data can be verified by referring to the encrypted quality data that is part of the encrypted assurance data. Encrypted assurance data 171, with or without unencrypted quality data 40, forms secure assurance data 181. Secure assurance data 181 is then associated with image data 20 in a secure assurance data association step 190 to form assured image 60.

Figure 16:
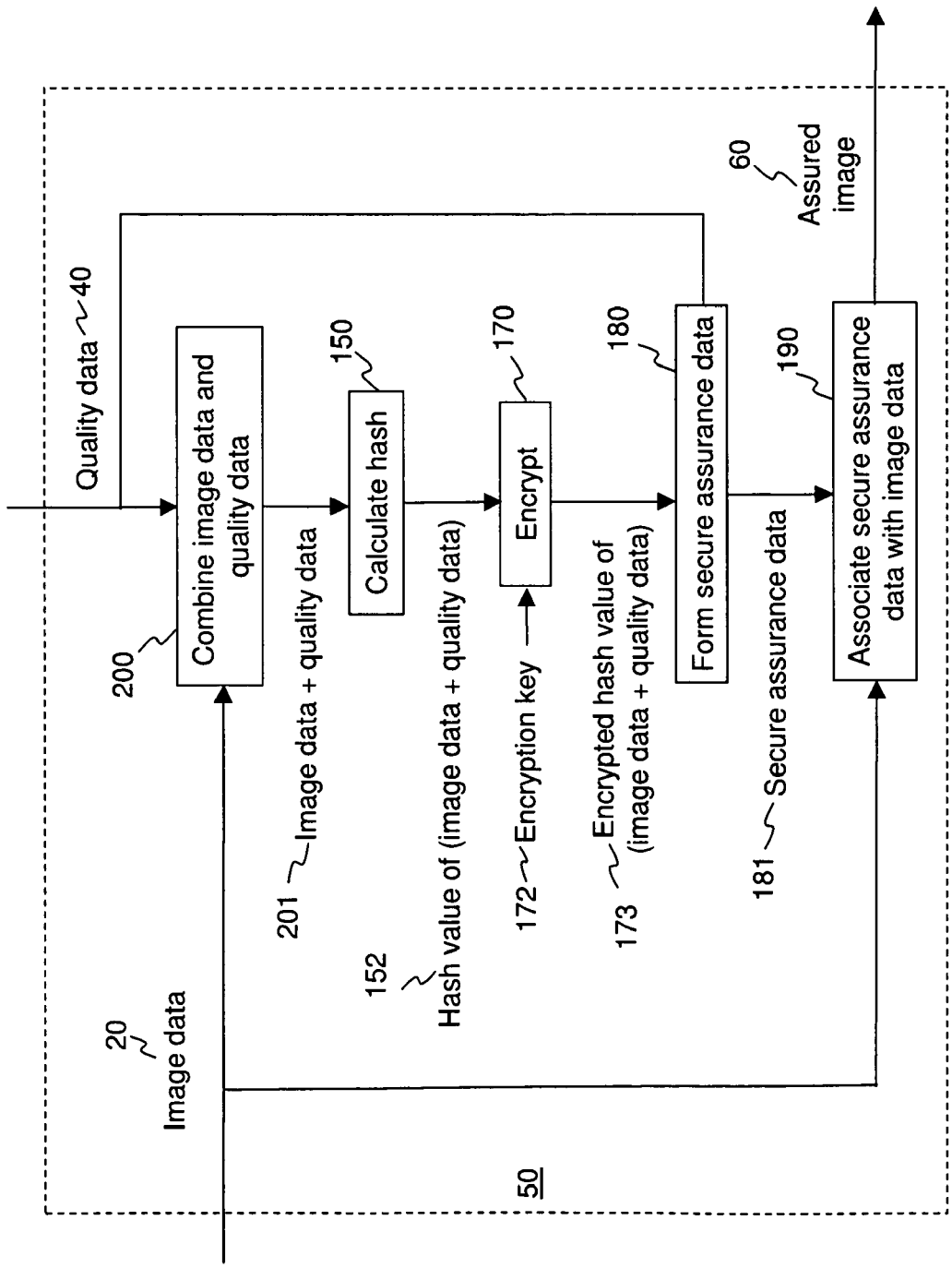
FIG. 16 is a block diagram showing a second embodiment of a method for producing secure assurance data with the present invention.

Referring to FIG. 16, a second embodiment of secure assurance data production and association step 50 is illustrated. Image data 20 and quality data 40 are combined in a combination step 200. The combination of the image data and quality data can be accomplished in a variety of ways, such as concatenating the image data and the quality data in a predefined order, for example. Combined image data and quality data 201 are then sent to hash calculation step 150 to produce a hash value 152 that represents the assurance data for combined image data and quality data. Hash value 152 for the combined image data and quality data is secured with encryption step 170 using encryption key 172 to produce an encrypted hash value 173 that represents secure assurance data for both the image data and the quality data. In this embodiment, quality data 40 are always included in the secure assurance data using secure assurance data formation step 180. This is necessary because the hash value provides only a distilled representation of the quality data, and the full quality data, which consists of image quality metrics 91 and assigned quality classes 121, must be made available for use in any subsequent processing that involves the quality data. Secure assurance data 181 is then associated with image data 20 in a secure assurance data association step 190 to form assured image 60.

Hash Value Calculation

An example of the algorithm that can be used in hash calculation step 150 is the Secure Hash Algorithm (SHA-1) of the U.S. National Institute of Standards and Technology (NIST). When a message of any length<($2^{64}$) bits is input to the algorithm, SHA-1 produces a 160-bit output called a message digest. Any change to a message will result, with very high probability, in a different message digest.

Encrypting the hash value of image data preserves the security of the image data while still allowing a user to view the image without the burden of decrypting the image data. Likewise, the hash value for the combined image data and quality data provides the security for both the image data and the quality data, with the advantage that any change to the image data will also render the image quality data as invalid because the hash value will have changed. However, a potential disadvantage of the hash value for the combined image data and quality data is that any change to the quality data will also render the image data as invalid, even though the image data may not have been tampered with.

Encryption

In one embodiment of the present invention, encryption of the assurance data in encryption step 170 is performed using a private encryption key of a public/private key pair system, such as is used in well-known public-key infrastructure (PKI) systems. By signing the assurance data with a private key, which is tied, for example, to a specific individual, organization, process, or device, the provenance of the assurance data is known (i.e., non-repudiation). Secure assurance data 181 may be used by anyone using the corresponding public key so that the quality and the integrity of the image data can be verified easily at any time. However, there may be applications where it is desirable to use only private keys (symmetric encryption) or even to use the public key of a public/private key pair to encrypt the assurance data.

It is noted that the assurance process that was just described does not include encryption of the image data itself. As mentioned previously, encryption can be computationally expensive for large amounts of data, such as is the case for high resolution images and video sequences. Still, it is recognized that some applications will require the image data to be encrypted to prevent unauthorized access to the contents of the image, such as financial, legal, medical, and defense applications, for example. The methods of the present invention for assessing image quality and linking it with the image data can be used whether or not the image data is also encrypted.

Assured Data Association

Referring again to FIGS. 15 and 16, the association of image data 20 and secure assurance data 181 can be achieved in a variety of ways in assurance data association step 190. Techniques for performing the assurance data association are disclosed in the method by McComb and the method by Honsinger et al., and are summarized in the following description.

Figure 17:
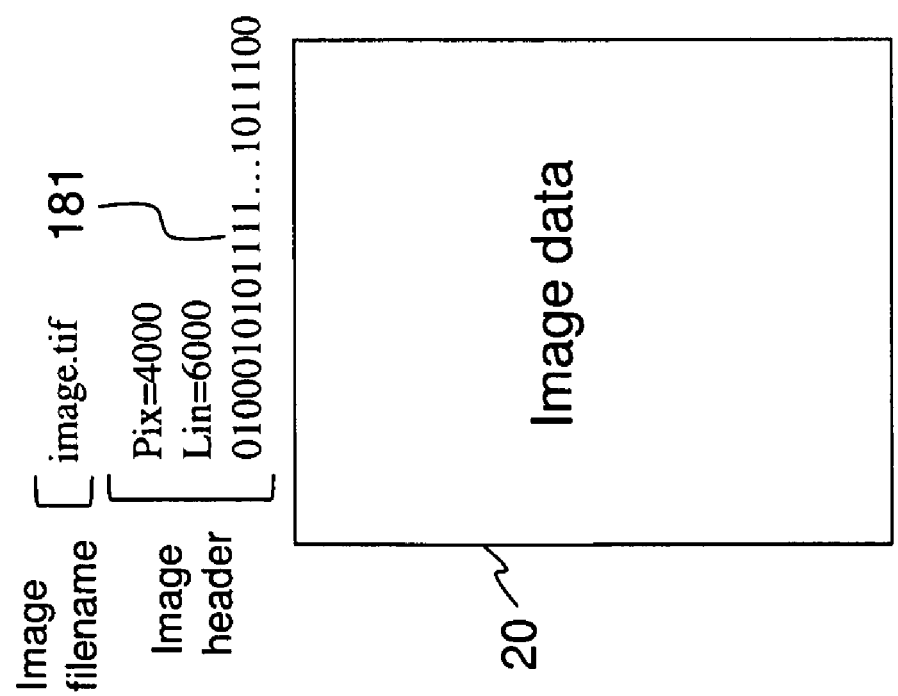
FIG. 17 illustrates an example of placing secure assurance data in an assured image header.

In one embodiment of the present invention, the encrypted bits that represent secure assurance data 181 are stored in the header of the digital image file that contains the image data 20 as shown in FIG. 17. For example, TIFF and many other image format specifications have provisions for user-defined data storage in the image header.

Figure 18:
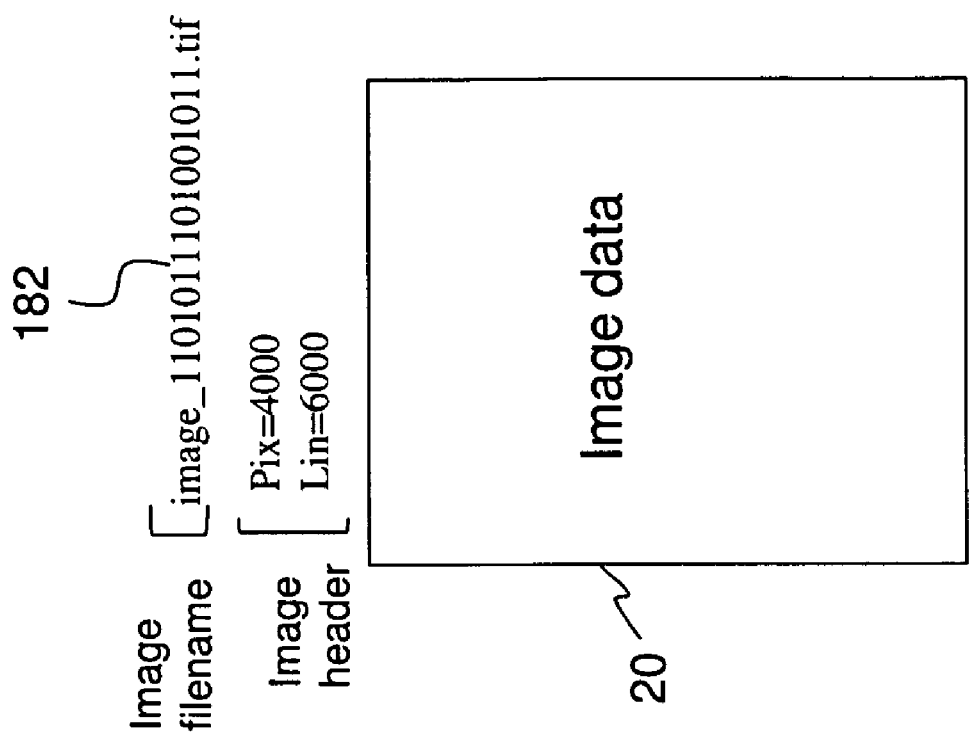
FIG. 18 illustrates an example of placing a unique identifier for secure assurance data in an assured image filename.

Alternatively, secure assurance data 181 may be sent to a local or remote database, and the image header or image filename can contain a unique reference value that is associated with the corresponding entry in the database as a type of pointer. The use of a database to store the assurance data is advantageous when the amount of assurance data is too great to be efficiently stored directly in the image header. FIG. 18 shows an example of a unique reference value 182 (denoted by the 16-bit string "1101011101001011") for the secure assurance data embedded in the TIFF file name example "image_1101011101001011.tif".

Figure 19:
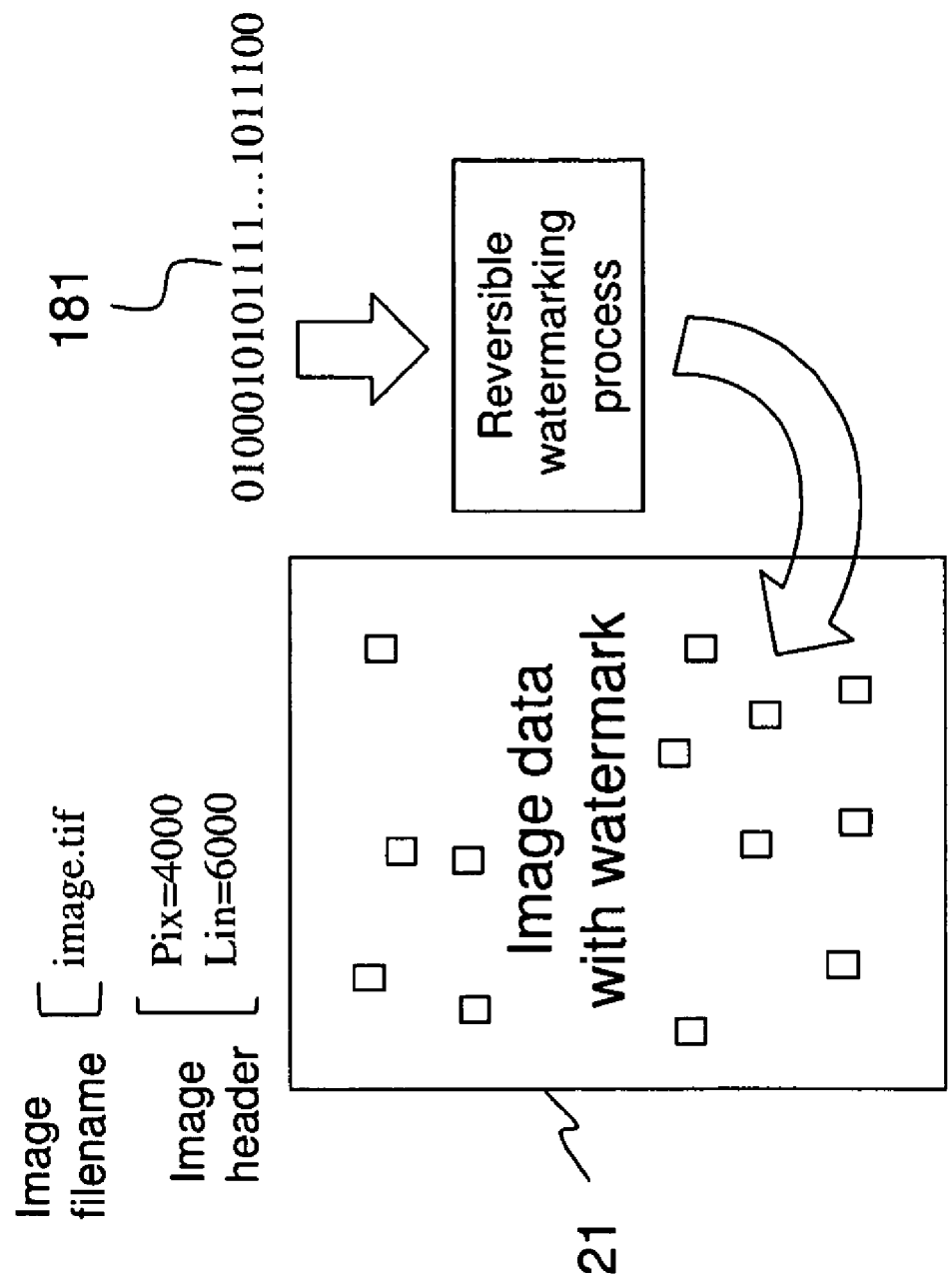
FIG. 19 illustrates an example of placing secure assurance data in assured image data using a reversible watermarking process.

The association of secure assurance data 181 with image data 20 can also be achieved using the method described in U.S. Pat. No. 5,912,972 by Barton, entitled "Method and apparatus for embedding authentication information within digital data" wherein the secure assurance data is directly embedded into the image data itself in a way that avoids detection by a casual observer, thereby preventing anyone from separating the assurance data from the image data. FIG. 19 illustrates an image file with watermarked image data 21 that contains secure assurance data 181. More generally, reversible watermarking techniques, such as those described in U.S. Pat. No. 6,895,101 by Celik et al., entitled "System and method for embedding information in digital signals" and U.S. Pat. No. 7,006,662 by Alattar et al., entitled "Reversible watermarking using expansion, rate control and iterative embedding" can be used to embed the assurance data into the image data, yet still allow the image data to be recovered and authenticated. Unlike image file embodiments shown in FIGS. 17 and 18, an image file prepared in this way would appear outwardly to be no different from a conventional image file.

Authentication of Image Data and Quality Data

As disclosed previously in the commonly assigned co-pending application by Honsinger et al., the image data and the quality data of an assured image can be easily authenticated at any time using the secure assurance data. The following description provides a summary of the authentication process as disclosed by Honsinger et al., with modifications that allow for the further authentication of the assigned quality classes.

Figure 20:
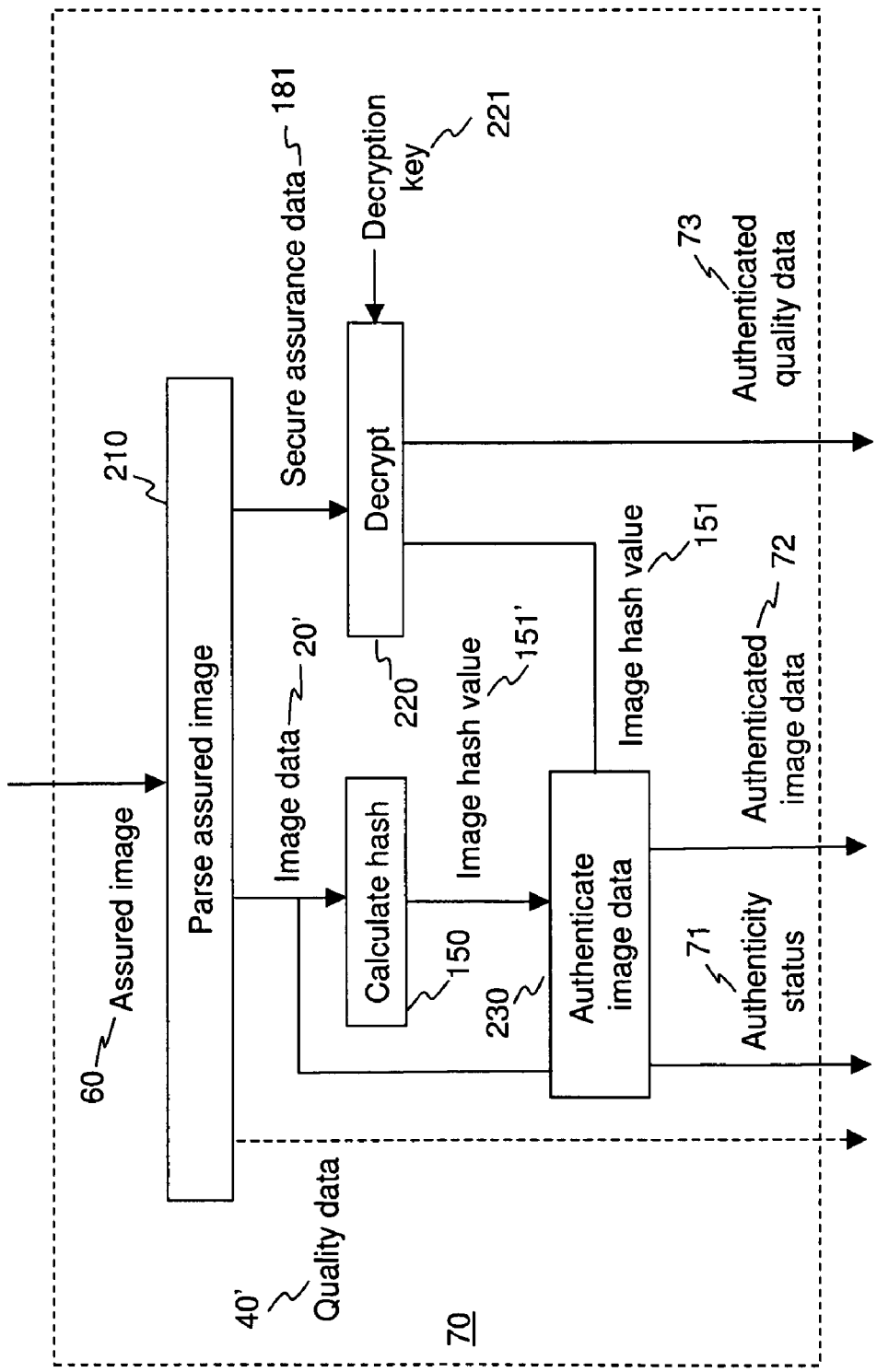
FIG. 20 is a block diagram showing a first embodiment of a method for authenticating an assured image with the present invention.

Referring to FIG. 20, an embodiment of authentication process 70 is shown for secure assurance data that includes an image hash value and quality metrics, as was described previously and shown in FIG. 15. Assured image 60 is separated into image data 20' and secure assurance data 181 using a parsing step 210. The prime symbol (') indicates that image data 20' may be different from image data 20 that was used in the assurance process, for example, due to tampering. Assured image 60 may also contain unencrypted quality data 40', which, like the image data, may or may not be the same as quality data 40 that was used to form the assured image. Image data 20' is then processed with hash calculation step 150 to produce image hash value 151', where the prime symbol (') again indicates that this image hash value may be changed from image hash value 151 that was produced in the assurance process. Secure assurance data 181 is decrypted using a decryption step 220 with a decryption key 221. In one embodiment, the decryption key is the public key of a private/public key pair. Alternatively, the decryption key might be a private key, depending upon the type of encryption that was used in forming the secure assurance data. The output of decryption step 220 is image hash value 151 and authenticated quality data 73. Image hash value 151 from the secure assurance data is then used to authenticate image data 20' by comparing image hash value 151 with image hash value 151' using an authentication step 230. If the two image hash values are the same, image data 20' is output as authenticated image data 72. If the two image hash values are different, image data 20' has been changed in some way from the original image data 20, and image data 20' is not authenticated. Authentication step 230 provides an indicator of the authenticity (or lack of authenticity) by the output of an authenticity status signal 71, which can be used, for example, to inform a user who obtains the result through a GUI, or to control the workflow for the assured image, for example, routing a tampered image to an exception handling process.

While authenticated quality data 73 is free from tampering because of encryption, it is not indicative of the quality of tampered image data and generally cannot be used when the image data cannot be authenticated. However, some restricted applications can still make use of the quality data without necessarily having authenticated image data, such as monitoring the image quality of a capture device, for example.

Figure 21:
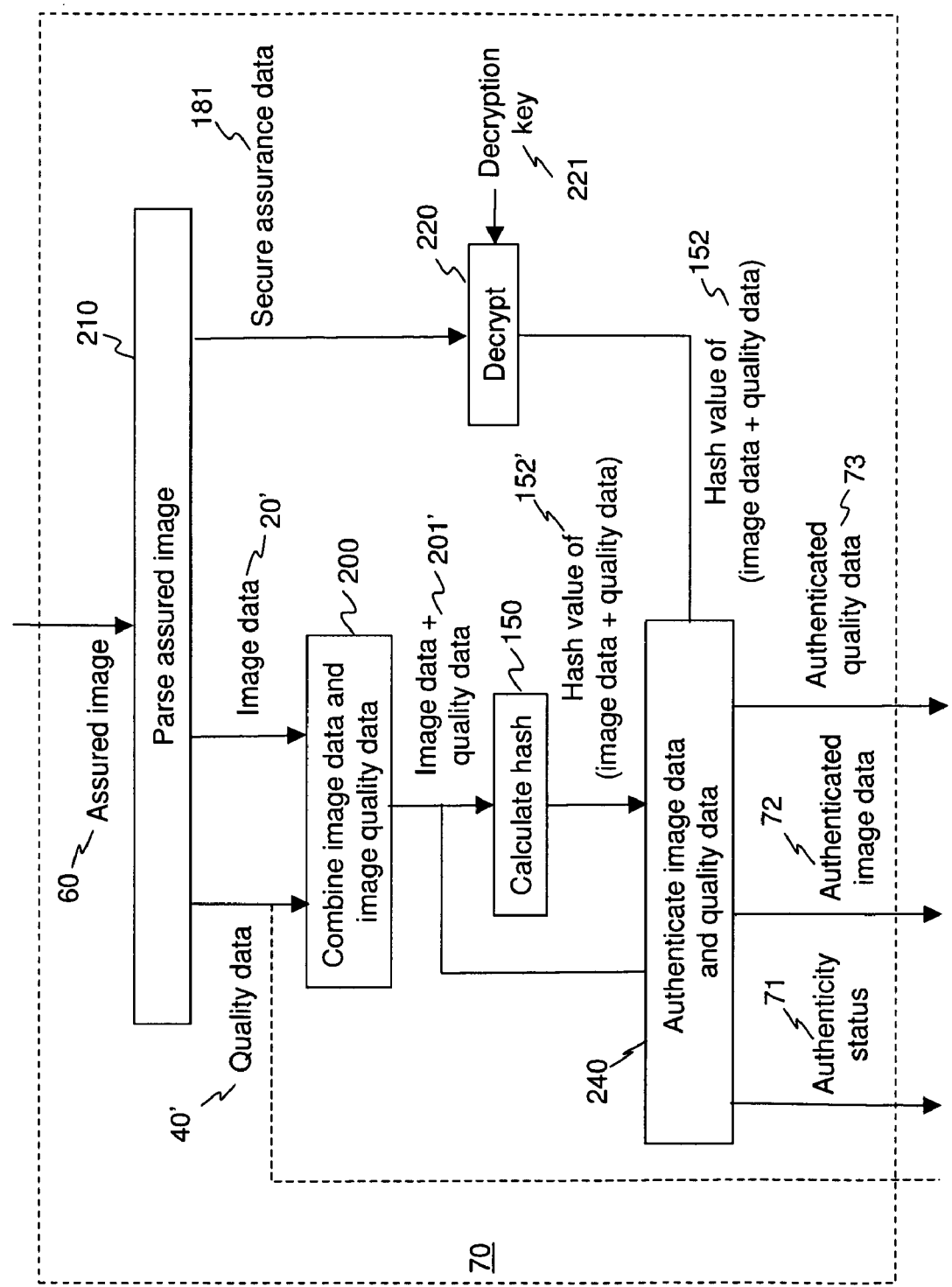
FIG. 21 is a block diagram showing a second embodiment of a method for authenticating an assured images with the present invention.

Referring to FIG. 21, an embodiment of authentication process 70 is shown for secure assurance data that includes a hash value for the combined image data and quality data, as was described previously and shown in FIG. 16. Assured image 60 is separated into quality data 40', image data 20', and secure assurance data 181 using an assured image parsing step 210. As described in the previous embodiment, image data 20' and quality data 40' may or may not be the same as image data 20 and quality data 40 that were used to form the assured image. Image data 20' and quality data 40' are then combined using a combination step 200 to produce combined image data and quality data 201'. Combined image data and quality data 201' are sent to hash calculation step 150 to produce a hash value 152'. Secure assurance data 181 is decrypted using decryption step 220 with decryption key 221. The output of decryption step 220 is the hash value 152 of the combined image data and quality data that were used in forming the secure assurance data. Hash value 152 from the secure assurance data is then used to authenticate image data 20' and quality data 40' by comparing hash value 152' with hash value 152 using authentication step 240. If the two hash values are the same, image data 20' is output as authenticated image data 72 and quality data 40' is output as authenticated quality data 73. If the two image hash values are different, either image data 20' has been changed in some way from the original image data 20, or quality data 40' has been changed in some way from the original quality data 40. In either case, neither image data 20' nor quality data 40' can be authenticated. An authentication step 240 provides an indicator of the authenticity (or lack of authenticity) by providing an authenticity status signal 71.

Thus, we have disclosed a robust and efficient method for assessing the image quality of image data using quality vectors and predefined quality classes. In addition, the assessed image quality can be secured in conjunction with the image data to produce an assured image, which allows the integrity and the quality of the assured image data to be quickly and easily verified at any time.

It will be understood that a computer program product that provides the present invention may make use of image manipulation algorithms and processes that are well known.

Thus, it will be understood that a computer program product embodiment of the present invention may embody algorithms, routines, and processes not specifically shown or described herein, such as are useful for implementation. Such algorithms, routines, and processes can be conventional and within the ordinary skill in such arts. Other aspects of such algorithms and systems, and hardware and/or software for producing and otherwise processing the images involved or co-operating with the computer program product of the present invention, may not be specifically shown or described herein and may be selected from such algorithms, systems, hardware, components, and elements known in the art.

The computer program for performing the method of the present invention may be stored in a computer readable storage medium. This medium may comprise, for example: magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program. The computer program for performing the method of the present invention may also be stored on computer readable storage medium that is connected to the image processor by way of the Internet or other communication medium. Those skilled in the art will readily recognize that the equivalent of such a computer program product may also be constructed in hardware or firmware known as application specific integrated circuits (ASICs) or as programmable digital logic chips, such as field programmable gate arrays (FPGAs).

The invention has been described in detail with particular reference to certain preferred embodiments thereof, but it will be understood that variations and modifications can be effected within the spirit and scope of the invention.

PARTS LIST

10 Digital image acquisition step
20 Image data
20' Image data, possibly changed
21 Image data with watermark
30 Image quality assessment process
40 Quality data
40' Quality data, possibly changed
50 Secure assurance data production and association process
60 Assured image
70 Authentication process
71 Authenticity status signal
72 Authenticated image data
73 Authenticated quality data
80 Image segmentation step
81 Segmented image data
90 Image quality metrics calculation step
91 Image quality metrics
91' Image quality metrics, possibly changed
100 Quality vector formation step
101 Quality vectors
110 External processes
111 Auxiliary quality metrics
120 Quality vector classification step
121 Assigned quality classes
130 Quality data representation step
140 Compound document image
141 Text region
142 Photograph region
143 Graphics region
145 Bank check image
146 Convenience amount region
147 Legal amount region
148 Signature region
149 MICR region
150 Hash calculation step
151 Image hash value
151' Image hash value, possibly changed
152 Assurance data (hash value of combined image data and quality data)
152' Hash value of combined image data and quality data, possibly changed
160 Image hash value and quality data combination step
161 Assurance data (combined image hash value and quality data)
170 Encryption step
171 Encrypted image hash value and quality data
172 Encryption key
173 Encrypted hash value of combined image data and quality data
180 Secure assurance data production step
181 Secure assurance data
182 Unique identifier for secure assurance data
190 Secure assurance data association step
200 Image data and quality data combination step
201 Combined image data and quality data
201' Combined image data and quality data, possibly changed
210 Assured image parsing step
220 Decryption step
221 Decryption key
220 Image data authentication step
240 Image data and quality data authentication step

The invention claimed is:

1. A method for assessing the image quality of image data, the method executed at least in part by a computer and comprising:
   acquiring the image data;
   segmenting the acquired image data into one or more spatial regions;
   obtaining a plurality of image quality measures for the one or more spatial regions;
   forming at least one quality vector that comprises two or more of the quality measures for the one or more spatial regions;
   classifying the at least one quality vector into one of a plurality of predefined quality classes;
   generating secure assurance data that is representative of the plurality of image quality measures, the quality classification, and the image data;
   and
   forming and storing an assured image by associating the secure assurance data with the acquired image data.

2. The method of claim 1 wherein the image quality measures are obtained from the acquired image data.

3. The method of claim 1 wherein the secure assurance data further comprises information that relates to performance of an image capture device used for acquiring the image data.

4. The method of claim 1 wherein classifying is performed using a supervised learning technique.

5. The method of claim 4 wherein classifying includes training on a plurality of image quality vectors corresponding to training image data that are associated with the plurality of predefined quality classes.

6. The method of claim 5 wherein the image data is acquired from a digital image capture device and the training image data is representative of the image data that is produced by the digital image capture device.

7. The method of claim 1 wherein generating the secure assurance data further comprises calculating a hash value of the image data and the image quality measures and the quality classification to produce assurance data.

8. The method of claim 7 further comprising encrypting the assurance data.

9. The method of claim 1 wherein associating the secure assurance data with the image data comprises forming a digital file having an image header and storing the secure assurance data in the image header.

10. The method of claim 1 wherein associating the secure assurance data with the image data comprises embedding the secure assurance data into the image data using a reversible watermarking technique.

11. The method of claim 1 further comprising:

parsing the secure assurance data and the image data and authenticating the image quality measures, the quality classification, and the image data using the secure assurance data;

and providing a status signal that is indicative of authenticity of at least one of the image quality measures and the quality classification.

12. A computerized method of associating an image with image quality information about said image, the method comprising:

obtaining image data at a computer;

generating secure assurance data that is representative of the obtained image data wherein the secure assurance data comprises two or more quality measures that are obtained at least from one or more spatial regions within the image data, and wherein the secure assurance data further comprises one or more assigned quality classes that are determined from the two or more quality measures;

combining the obtained image data with the generated secure assurance data to form an assured image;

and outputting the assured image from the computer.

* * * * *